(12) United States Patent
Lin

(10) Patent No.: US 12,068,993 B2
(45) Date of Patent: Aug. 20, 2024

(54) METHOD AND APPARATUS FOR UNIFIED DESIGN OF PDCCH AND RS BASED PAGING EARLY INDICATION

(71) Applicant: Samsung Electronics Co., Ltd., Suwon-si (KR)

(72) Inventor: Qiongjie Lin, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 17/650,065

(22) Filed: Feb. 4, 2022

(65) Prior Publication Data

US 2022/0271878 A1 Aug. 25, 2022

Related U.S. Application Data

(60) Provisional application No. 63/302,329, filed on Jan. 24, 2022, provisional application No. 63/275,784, filed on Nov. 4, 2021, provisional application No. 63/243,515, filed on Sep. 13, 2021, provisional application No. 63/187,618, filed on May 12, 2021, provisional application No. 63/151,320, filed on Feb. 19, 2021.

(51) Int. Cl.
*H04L 5/00* (2006.01)
*H04W 68/02* (2009.01)

(52) U.S. Cl.
CPC ............. *H04L 5/005* (2013.01); *H04W 68/02* (2013.01)

(58) Field of Classification Search
CPC ................ H04W 68/02; H04L 5/005
USPC ........................................................ 370/336
See application file for complete search history.

(56) References Cited

U.S. PATENT DOCUMENTS

2019/0373581 A1 12/2019 Ryu et al.
2020/0351818 A1 11/2020 Park et al.

OTHER PUBLICATIONS

"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.

(Continued)

*Primary Examiner* — Peter G Solinsky

(57) ABSTRACT

Methods and apparatus for physical downlink data channel (PDCCH) and reference signal (RS) based paging in a wireless communication system. A method includes receiving: a first configuration for a search space set in common search space (CSS), wherein the search space set is for a downlink control information (DCI) format that includes a tracking RS (TRS) availability indication field, wherein the TRS availability indication field in the DCI format provides a bitmap; and a second configuration for a number of TRS resources sets. The method further includes determining a TRS resources set from the number of TRS resources sets associated with a bit from the bitmap, wherein TRS resources from the TRS resources set are present for a time duration based on an associated bit for the TRS resources set in the bitmap; and receiving TRS resources from the number of TRS resources sets that are present.

16 Claims, 10 Drawing Sheets

(56) References Cited

OTHER PUBLICATIONS

"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
International Search Report and Written Opinion issued Jun. 8, 2022 regarding Application No. PCT/KR2022/002409, 6 pages.
Zte et al., "TRS for RRC idle and inactive UEs", 3GPP TSG RAN WG1 #104-e, R1-2100524, Jan. 2021, 8 pages.
Lenovo et al., "Provision of TRS/CSI-RS for idle/inactive UEs", 3GPP TSG RAN WG1 Meeting #104-e, R1-2100999, Jan. 2021, 4 pages.
Vivo, "RAN2 impacts on TRS/CSI-RS in idle/inactive mode", 3GPP TSG RAN WG2 #113-e, R2-2100458, Jan. 2021, 6 pages.
Extended European Search Report issued Jun. 27, 2024 regarding Application No. 22756540.5, 21 pages.
Moderator (Samsung), "Moderator summary for TRS/CSI-RS occasion(s) for idle/inactive UEs", 3GPP TSG RAN WG1 #104-e, R1-2101218, Jan. 2021, 84 pages.
Lenovo et al., "Paging enhancement for UE power saving", 3GPP TSG RAN WG1 Meeting #104-e, R1-2100998, Jan. 2021, 5 pages.
OPPO, "Further discussion on RS occasion for idle/inactive UEs", 3GPP TSG RAN WG1 #104-e, R1-2100169, Jan. 2021, 5 pages.
Ericsson, "Design of Paging Enhancements", 3GPP TSG-RAN WG1 Meeting #104-e, R1-2101555, Jan. 2021, 9 pages.

METHOD AND APPARATUS FOR UNIFIED DESIGN OF PDCCH AND RS BASED PAGING EARLY INDICATION

CROSS-REFERENCE TO RELATED APPLICATIONS AND CLAIM OF PRIORITY

The present application claims priority to:
U.S. Provisional Patent Application No. 63/151,320, filed on Feb. 19, 2021;
U.S. Provisional Patent Application No. 63/187,618, filed on May 12, 2021;
U.S. Provisional Patent Application No. 63/243,515, filed on Sep. 13, 2021;
U.S. Provisional Patent Application No. 63/275,784, filed on Nov. 4, 2021; and
U.S. Provisional Patent Application No. 63/302,329, filed on Jan. 24, 2022.
The content of the above-identified patent document is incorporated herein by reference.

TECHNICAL FIELD

The present disclosure relates generally to wireless communication systems and, more specifically, the present disclosure relates to a unified design of physical downlink data channel (PDCCH) and reference signal (RS) based paging early indication in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a unified design of PDCCH and RS based paging early indication in a wireless communication system.

In one embodiment, a user equipment (UE) is provided. The UE includes a transceiver configured to receive: a first configuration for a search space set in common search space (CSS), wherein the search space set is for a downlink control information (DCI) format that includes a tracking reference signal (TRS) availability indication field; a second configuration for a number of TRS resource sets; and a system information block that includes a third configuration for discontinuous reception (DRX) operation for paging. The third configuration provides a DRX cycle, $T_{DRX}$, in terms of a number of frames, and an offset, $O_{offset}$. The UE further includes a processor operably coupled to the transceiver. The processor is configured to: decode the DCI format in a first PDCCH reception occasion from the search space set, wherein the TRS availability indication field in the DCI format provides a bitmap; and determine a TRS resource set from the number of TRS resource sets is associated with a bit from the bitmap, wherein TRS resources from the TRS resource set are present for a time duration, $T_{valid}$, starting from a reference time if an associated bit for the TRS resources set in the bitmap has a value of "1". The transceiver is further configured to receive TRS resources from the number of TRS resource sets that are present.

In another embodiment, a base station (BS) is provided. The BS includes a transceiver configured to transmit: a first configuration for a search space set in CSS, wherein the search space set is for a DCI format that includes a TRS availability indication field; a second configuration for a number of TRS resources sets; and a system information block that includes a third configuration for DRX operation for paging. The third configuration provides a DRX cycle, $T_{DRX}$, in terms of a number of frames, and an offset, $O_{offset}$. The BS further includes a processor operably connected to the transceiver. The processor is configured to encode the DCI format in a first PDCCH transmission occasion from the search space set, wherein the TRS availability indication field in the DCI format provides a bitmap; and determine a TRS resources set from the number of TRS resources sets is associated with a bit from the bitmap, wherein TRS resources from the TRS resources set are present for a time duration, $T_{valid}$, starting from a reference time if an associated bit for the TRS resources set in the bitmap has a value of "1". The transceiver is further configured to transmit TRS resources from the number of TRS resources sets that are present.

In yet another embodiment, a method is provided. The method includes receiving: a first configuration for a search space set in CSS, wherein the search space set is for a DCI format that includes a TRS availability indication field, a second configuration for a number of TRS resources sets, and a system information block that includes a third configuration for DRX operation for paging. The third configuration provides a DRX cycle, $T_{DRX}$, in terms of a number of frames, and an offset, $O_{offset}$. The method further includes decoding the DCI format in a first PDCCH reception occasion from the search space set, wherein the TRS availability indication field in the DCI format provides a bitmap; determining a TRS resources set from the number of TRS resources sets is associated with a bit from the bitmap, wherein TRS resources from the TRS resources set are present for a time duration, $T_{valid}$, starting from a reference time based on an associated bit for the TRS resources set in the bitmap having a value of "1"; and receiving TRS resources from the number of TRS resources sets that are present.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein:

3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
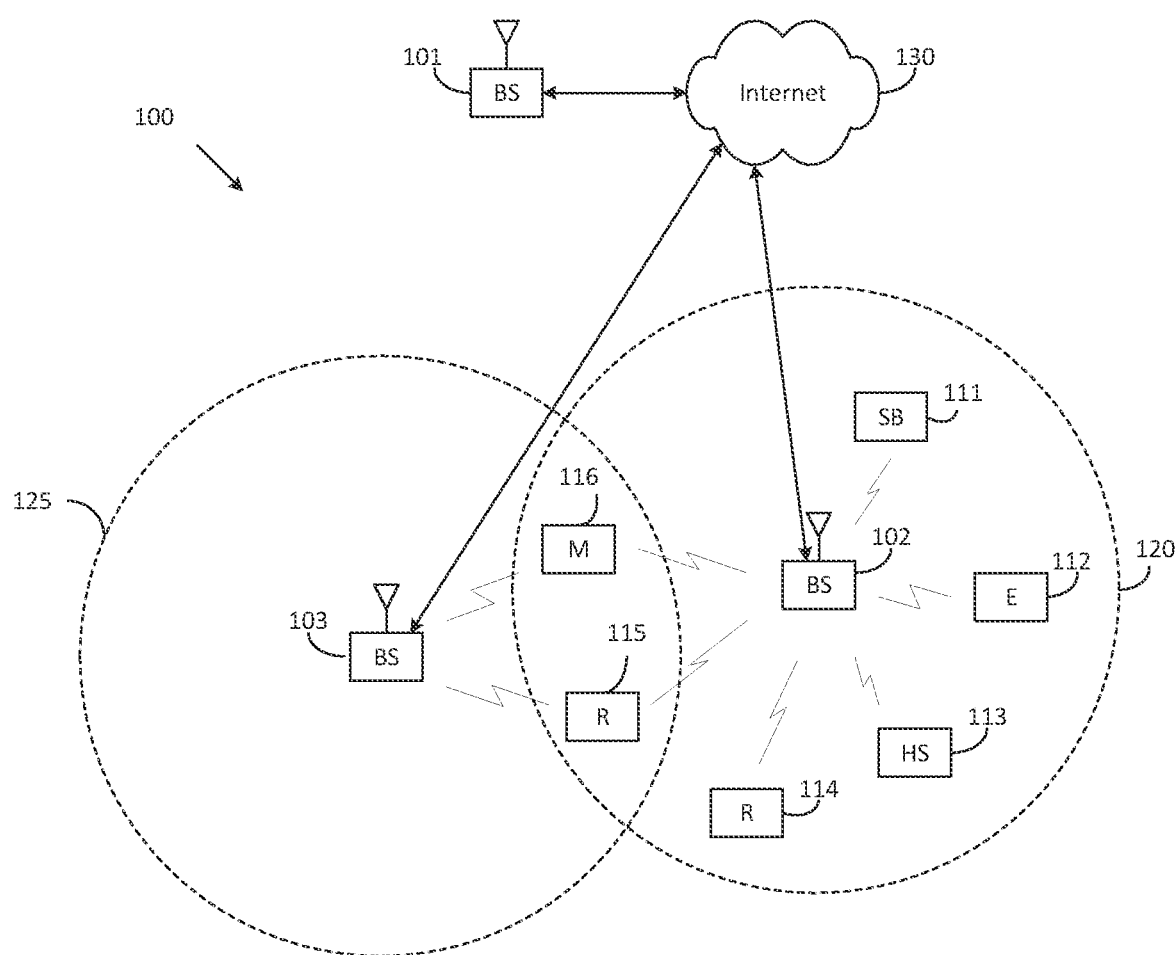
FIG. 1 illustrates an example of wireless network according to embodiments of the present disclosure.
Figure 2:
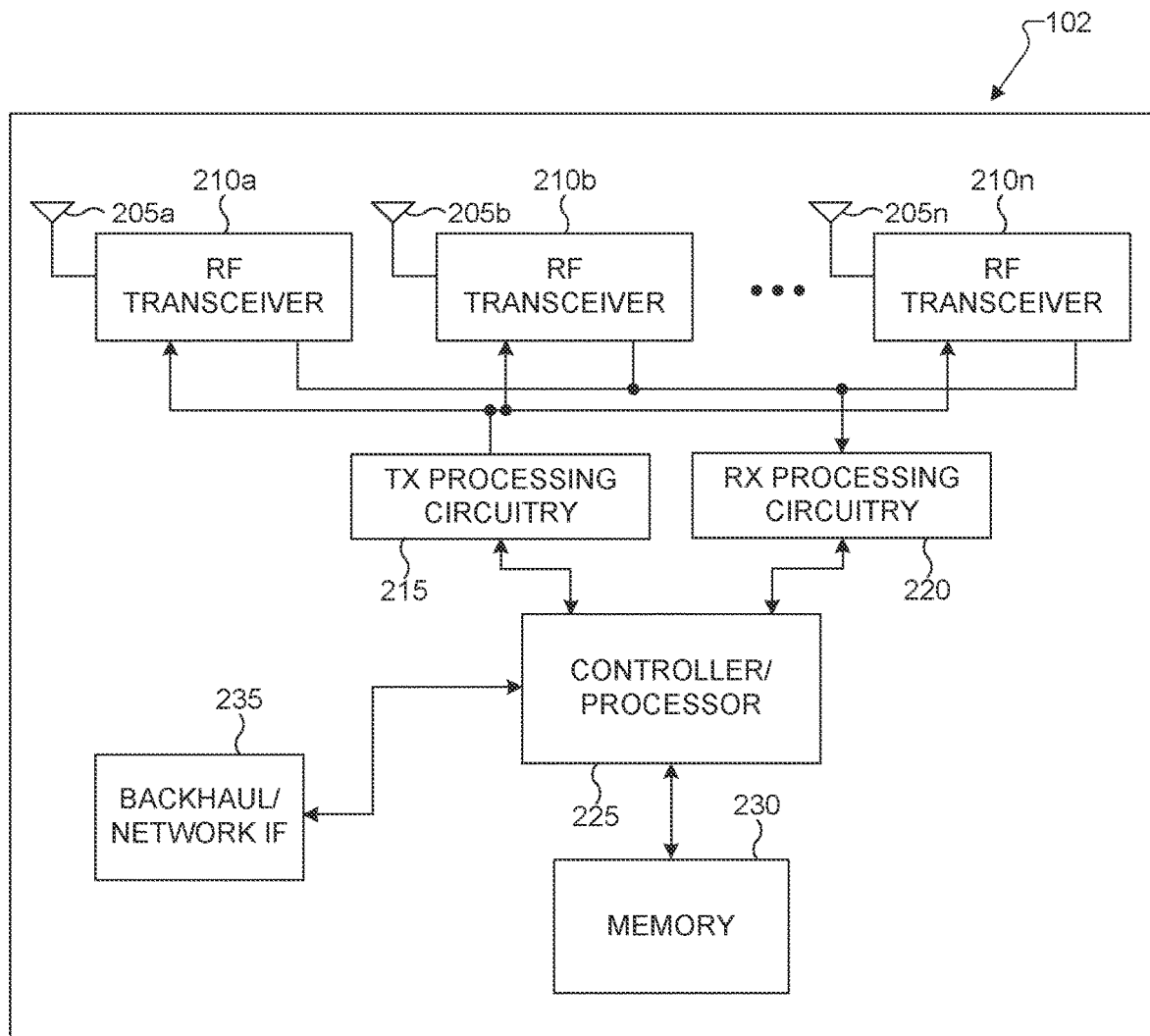
FIG. 2 illustrates an example of gNB according to embodiments of the present disclosure.
Figure 3:
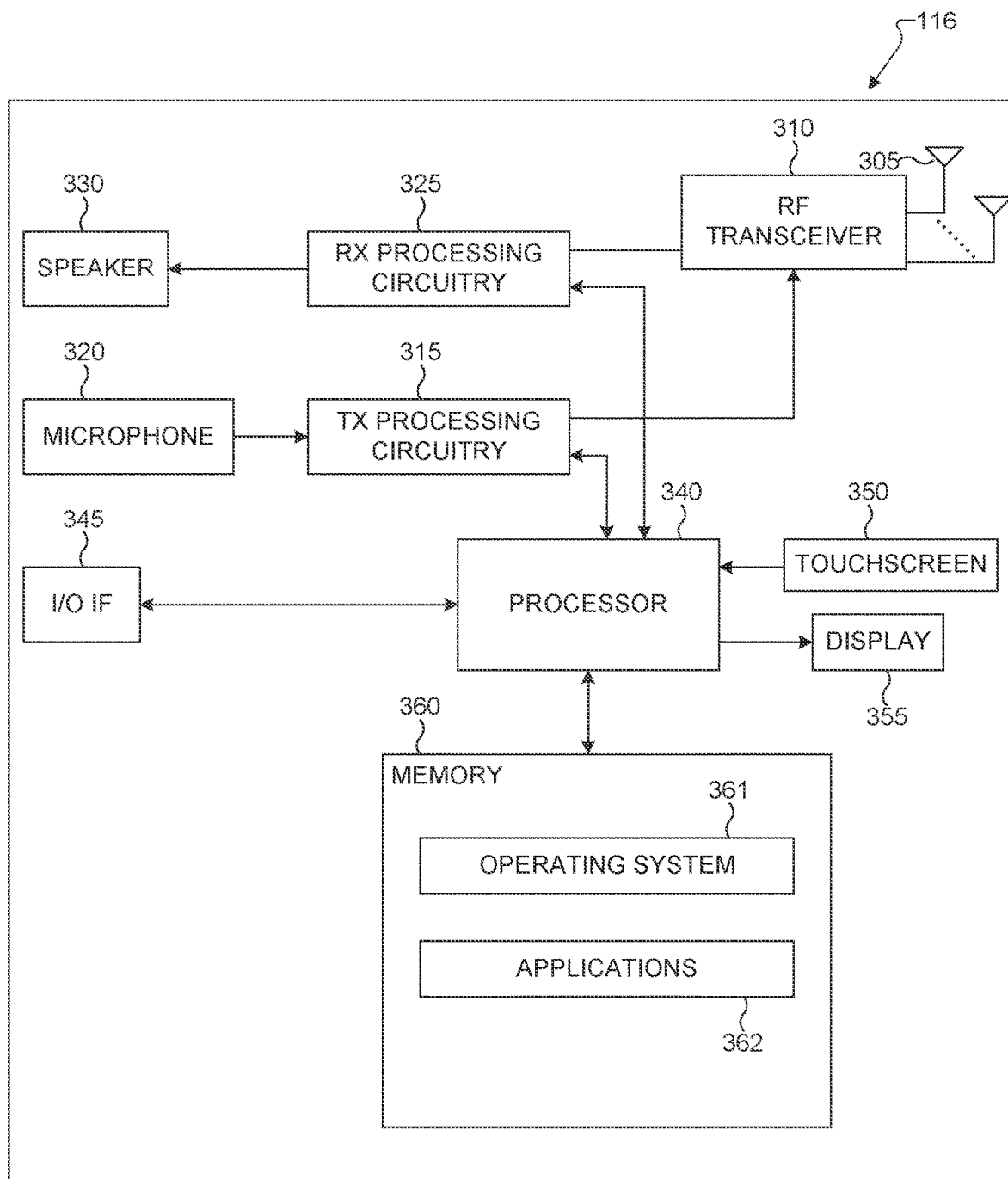
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for a unified design of PDCCH and RS based paging early indication in a wireless communication system. In certain embodiments, and one or more of the gNBs 101-103 includes circuitry, programming, or a combination thereof, for a unified design of PDCCH and RS based paging early indication in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of downlink (DL) channel signals and the transmission of uplink (UL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a unified design of PDCCH and RS based paging early indication in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a unified design of PDCCH and RS based paging early indication in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and RS that are also known as pilot signals. A gNB transmits data information or DCI through respective physical DL shared channels (PDSCHs) or PDCCHs. A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
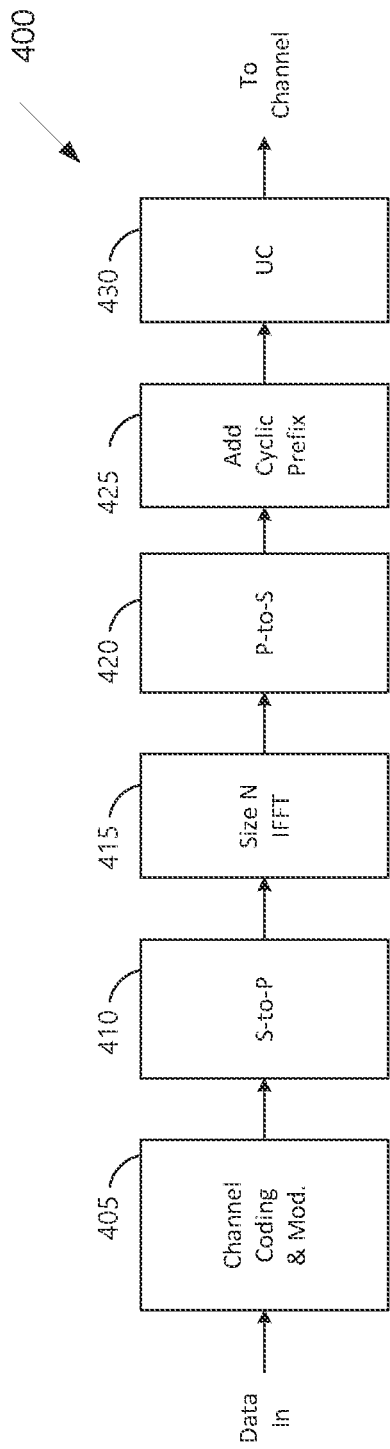
FIGS. 4 and 5 illustrate example of wireless transmit and receive paths according to this disclosure.
Figure 5:
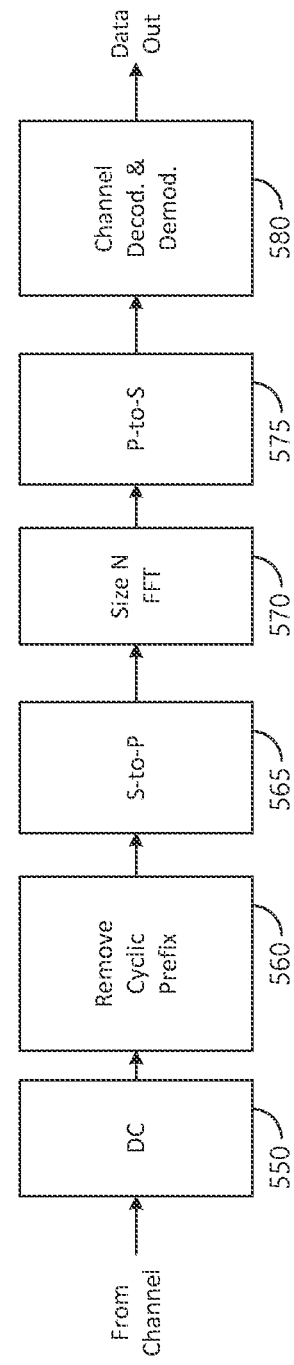

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For a UE operates in an RRC_IDLE/INACTIVE state, the UE can be configured to monitoring Type2-PDCCH for paging message per DRX cycle. The paging messages are sent by an MME to all gNodeBs in a tracking area and those gNodeBs in a tracking area are transmitting the same paging message. For 5G NR, a PO is a set of PDCCH monitoring occasions and can consist of multiple time slots (e.g., subframe or OFDM symbol) where paging DCI can be sent. The PDCCH monitoring occasions (MOs) of paging are determined according to paingSearchSapce as specified in 3GPP standard specifications.

However, a UE may waste energy to wake for paging PDCCH monitoring when there is no paging message dedicated to the UE. A paging early indication (PEI) is studied in Rel-17 to avoid unnecessary wake-ups for paging monitoring.

The main design aspect for PEI is the L1 signal/channel design. Both PDCCH based and RS based solutions can be considered. There are benefits for both PDCCH based design and RS based design. For PDCCH based PEI, it can be used to carry large size of indication information. For example, multiple PEIs dedicated to multiple groups or subgroups of UEs. For RS based PEI, the resource overhead is low when paging rate is small or the indication information size is small. Also, the RS based PEI can be used for synchronization purpose as well, so that a UE can relax processing on SS/PBCH blocks for synchronization purpose. The detection of RS based PEI is also not sensitive to synchronization error, which is beneficial for idle/inactive mode UEs.

To take advantages of both PDCCH based solution or PEI based solution, a unified design can be considered.

Therefore, there is a need to support paging early indication transmitted by a DCI format in a PDCCH.

Therefore, there is another need to support paging early indication transmitted by a RS.

There is yet another need to support paging early indication based on either a DCI format or a RS.

There is also another need to support availability indication of TRS/CSI-RS occasions to idle/inactive UEs based on both L1 signaling and/or SIB based signaling, where the L1 signaling can be common for both PEI and the availability indication.

A first embodiment of this disclosure considers PEI via a PDCCH. The PEI indicates whether or not a group of UEs may monitor PDCCH in a paging occasion (PO). The type of PEI is referred as PDCCH based PEI in this disclosure. The applicable UEs can be either in an RRC_IDLE/INACTIVE state or an RRC_CONNECTED state with configured PO to monitor. The PDCCH based PEI is received by the UE in DL BWP same as the DL BWP for PO.

A UE can be provided with a configuration for PDCCH based PEI, such that a PEI is included in a DCI format via a PDCCH. The PEI included in the DCI format can indicate any of the following UE behavior(s) for PDCCH monitoring in an associated PO: (1) in one example, the PEI indicates the UE to monitor PDCCHs in the associated PO. The PEI included in the DCI format can be a binary bit with value of "1"; and (2) in another example, the PEI indicates the UE to skip PDCCHs monitoring in the associated PO. The PEI included in the DCI format can be a binary bit with value of "0."

If the UE does not receive a DCI format that includes a PEI, the UE monitors PDCCHs in the associated PO; otherwise, the UE monitors PDCCHs or skips PDCCH monitoring in the associated PO based on the received PEI in the DCI format.

A DCI format can include a number of N>=1 PEI(s) for a number of $N_{UE\_groups} \geq 1$ group of UEs associated with a number of $N_{UE\_groups}$ consecutive PO(s), wherein each of the number of N>=1 PEI(s) is for a number of UEs monitor PDCCH in a PO from the number of $N_{UE\_groups}$ consecutive PO(s), and $N_{UE\_groups} >= N$. A UE configured to monitor a PO with index i, (i=0, 1, 2, . . . , $N_{UE\_groups}$−1) from the $N_{UE\_groups}$ consecutive PO(s) determines index of an associated PEI to receive, n, (n=0, 1, 2, . . . , N−1) from the N>=1 PEI(s) based on one of the following embodiments.

In one embodiment, $N_{UE\_groups}$. The UE configured to monitor the (i+1)th, i=0, . . . , $N_{UE\_groups}$−1 PO from the $N_{UE\_groups}$ consecutive PO(s) determines the index of an associated PEI, n=i. The (n+1)th PEI from the N>=1 PEI(s) is for a group of UEs configured to monitor the (n+1)th PO from the $N_{UE\_groups}$ consecutive PO(s) when $N_{UE\_groups}$=N.

In another embodiment, the UE configured to monitor the (i+1)th, i=0, . . . , $N_{UE\_groups}$−1 PO from the $N_{UE\_groups}$ consecutive PO(s) determines the index of an associated PEI.

$$n = \left\lceil \frac{(i+1) \cdot N}{N_{UE\_groups}} \right\rceil - 1.$$

The (n+1)th (n=0, 1, 2, . . . , N−1) PEI from the N>=1 PEI(s) is for one or more group(s) of UEs, where each of the one or more group(s) UEs are configured to monitor (i+1)th PO from the $N_{UE\_groups}$ consecutive PO(s), wherein $$n = \left\lceil \frac{(i+1) \cdot N}{N_{UE\_groups}} \right\rceil - 1.$$

In yet another embodiment, a DCI format can include a number of N PEI(s), where N is determined based on $N_{UE\_groups}$ and $N_{subgroups}^{PO}$. $N_{UE\_groups}$ is the number of UE groups, where a group of UEs are the UEs configured to monitor PDCCH in a PO. $N_{subgroups}^{PO}$ is the number of UE subgroups per PO. A UE can be provided with a UE subgroup index j (j=0, 1, . . . , $N_{subgroups}^{PO}$−1) from a group with index (i=0, 1, 2, . . . , $N_{UE\_groups}$−1) for PDCCH monitoring in the (i+1)th PO from the N=$N_{UE\_groups}$·consecutive PO(s). The UE determines index of an associated PEI to receive, n, (n=0, 1, 2, . . . , N−1) based on a UE subgroup index, j, and the UE group index, i. For example, N=$N_{UE\_groups} \cdot N_{subgroups}^{PO}$, and n=i·$N_{subgroups}^{PO}$+j.

The UE receives PEI from the associated PEI, and does not expect to receive other PEIs.

The DCI format for PEI can be one of the following methods: (1) in one method, the DCI format has CRC bits scrambled by PS-RNTI. The DCI format can be DCI format 2_6; (2) in another method, the DCI format has CRC bits scrambled by P-RNTI; and (3) in yet another method, the DCI format has CRC bits scrambled by a RNTI dedicated to PEI, for example, PEI-RNTI. The dedicated RNTI can be determined based on either a P-RNTI or a UE ID used for paging reception.

For determining the DCI format that includes the PEI, the UE can be provided with any of the following information: (1) a payload size of the DCI format, in one example, the payload size can be provided by higher layers. In another example, the payload size can equal to the payload size of DCI format 1_0 with CRC scrambled by P-RNTI; and (2) a starting position of the DCI field for PEI, alternatively, the starting position can be fixed. In one example, to be the first bit of payload. In another example, the DCI fields for PEI(s) is after TB scaling field in DCI format 1_0 with CRC bits scrambled by P-RNTI. In yet another example, the DCI field for PEI(s) is within short message in DCI format 1_0 with CRC bits scrambled by P-RNTI.

The DCI format that includes PEI can also include information in addition to PEI, the information can be an availability indication for TRS/CSI-RS for idle/inactive UEs. The start location of information in addition to PEI can be the first bit after the PEI.

Figure 6:
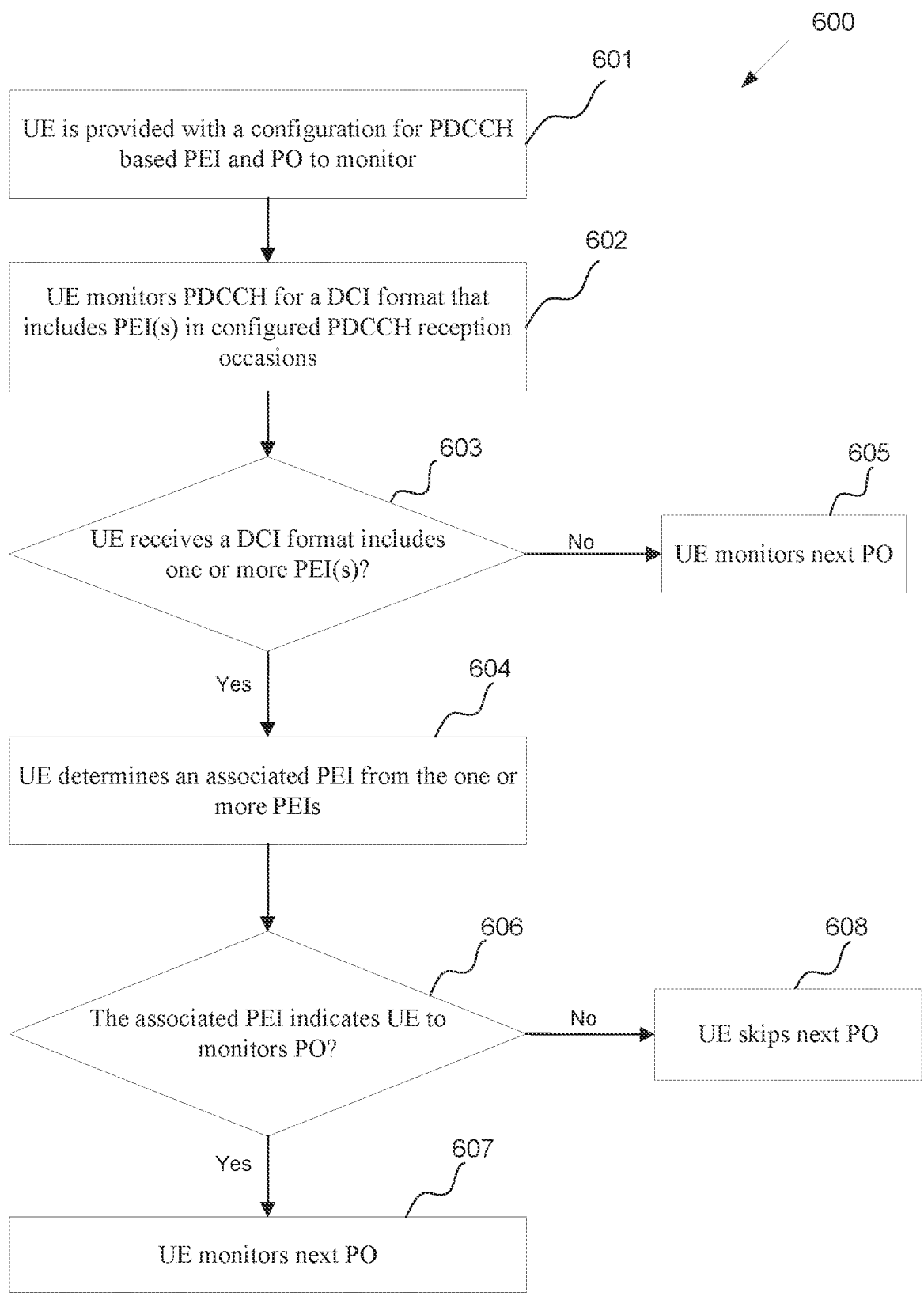
FIG. 6 illustrate a flowchart of a UE method for PDCCH configuration according to embodiments of the present disclosure.

FIG. 6 illustrates a flowchart of a UE method 600 for PDCCH configuration according to embodiments of the present disclosure. The UE method 600 as may be performed by a UE (e.g., 111-116 as illustrated in FIG. 1). An embodiment of the UE method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a UE is provided with a configuration for PDCCH based PEI and PO to monitor in step 601. The UE monitors PDCCH for a DCI format that includes PEI(s) in configured PDCCH monitoring occasions according to the configuration in step 402. The UE determines whether or not the UE receives a DCI format that includes one or more PEI(s) via a PDCCH in step 603. If the UE receives a DCI format that includes one or more PEI(s), the UE determines an associated PEI from the one or more PEI(s) in the received DCI format in step 604; otherwise, the UE monitors the next PO in step 605. The UE further determines whether or not the associated PEI indicates the UE to monitor PO in step 606. If the UE associated PEI indicates the UE to monitor PO, the UE monitors PDCCHs in the next PO in step 607; otherwise, the UE skips the next PO in step 608.

A UE can be provided with $K>=1$ PDCCH receptions occasion(s) for PDCCH based PEI per PEI reception.

In a first method for determines location of the $K>=1$ PDCCH receptions occasion(s) for PDCCH based PEI, the UE is provided with a search space set for the DCI format that includes PEI. The UE determines the $K>=1$ PDCCH receptions occasion(s) for PEI to be the last K consecutive PDCCH reception occasion(s) before the start of the first PO from the M consecutive PO(s) according to the configuration of the search space set.

In a second method for determining location of the $K>=1$ PDCCH receptions occasion(s), the location is determined relatively to associated $N_{UE\_groups}$ consecutive PO(s), wherein the UE is provided with a slot offset, $T_{slot}^{offset}$, between the start of the first PDCCH receptions occasion from the $K>=1$ PDCCH receptions occasion(s) to the start of the first PO from the $N_{UE\_groups}$ consecutive PO(s). The $K>=1$ PDCCH receptions occasion(s) are within $N_{slots} \leq K$ consecutive slots starting from slot with index $n_{start,slot}^{PEI}$, such that $n_{start,slot}^{PEI} = n_{start,slot}^{PO\_first} - T_{slot}^{offset}$, where $n_{start,slot}^{PO\_first}$ is slot index for the first slot of the first PO from the $N_{UE\_groups}$ consecutive PO(s).

In a third method for determining location of the $K>=1$ PDCCH receptions occasion(s), the location is determined relatively to associated $N_{UE\_groups}$ consecutive PO(s), wherein the UE is provided with a slot offset, $T_{slot}^{offset}$, between the end of the last PDCCH receptions occasion from the $K>=1$ PDCCH receptions occasion(s) the start of the first PO from the $N_{UE\_groups}$ consecutive PO(s). The $K>=1$ PDCCH receptions occasion(s) are within $N_{slots} \leq K$ consecutive slots starting from slot with index $n_{start,slot}$, such that $n_{start,slot}^{PEI} = n_{start,slot}^{PO\_first} - T_{slot}^{offset} - N_{slots}$, where $n_{start,slot}^{PO\_first}$ is slot index for the first slot of the first PO from the $N_{UE\_groups}$ consecutive PO(s).

The UE can be provided with $N_{occasions}^{slot} \geq 1$ first symbol(s) of PDCCH receptions occasion(s) for PEI. The $K>=1$ PDCCH receptions occasion(s) are the $N_{slots}$ consecutive slots starting from slot $n_{start,slot}^{PEI}$, where $$N_{slots} = \left\lceil \frac{K}{N_{occassions}^{slot}} \right\rceil.$$

For example, the UE is provided with a bitmap, where an index of a bit from the bitmap with value of "1" indicates the index of the first symbol for a PDCCH reception occasion. For another example, $N_{occasions}^{slot} = 1$, and each of the $K>=1$ PDCCH receptions occasion(s) is $N_{symbols}$ consecutive symbols starting from a symbol with index $n_{symbol}$ within a slot, for example, $n_{symbol} = 0$. $N_{symbols}$ is determined based on a configuration of a CORESET.

$T_{slot}^{offset}$ can be determined based on one of the following methods: (1) in one method, $T_{slot}^{offset}$ is defined in the specification of the system operation, e.g., 10 slots; (2) in another method, $T_{slot}^{offset}$ is provided to the UE by higher layers, for example, in the configuration of the PDCCH based PEI; and/or (3) in yet another method, $T_{slot}^{offset}$ can be determined based on information reported from a UE, e.g., a UE capability report or a UE assistance report. In one example, the UE can report a minimum time offset, $T_{slot,min}^{offset}$ to indicate the minimum value for $T_{slot}^{offset}$ the UE required to receive PDCCH based PEI. The UE assumes $T_{slot}^{offset} \geq T_{slot,min}^{offset}$. In another example, the UE can report the value for $T_{slot}^{offset}$ directly.

$T_{slot}^{offset}$ or $T_{slot,min}^{offset}$ can also be derived based on an equivalent value in unit of one millisecond or number of symbols, where the equivalent value is determined based on any of the above methods. For example, the equivalent value for $T_{slot,min}^{offset}$ in unit of one millisecond can be at least 20 ms to allow additional SSBs between PEI and associated PO.

In a fourth method for determining location of the $K>=1$ PDCCH reception occasion(s) for PDCCH based PEI, the first PDCCH monitoring occasion of the $K>=1$ PDCCH reception occasion(s) can be provided to UEs by higher layers. On one example, a configuration parameter, firstPDCCH-MonitoringOccasionOfPEI, can indicate first PDCCH monitoring occasion for every $N_{UE\_groups}$ PO(s). firstPDCCH-MonitoringOccasionOfPEI indicates the time offset in terms of number of symbols between the first PDCCH MOs for PEI and the start of the radio frame associated with the PEI. The design of firstPDCCH-MonitoringOccasionOfPEI can be same as firstPDCCH-MonitoringOccasionOfPO. For example, the applicable values can be same. For another example, there can be more than one firstPDCCH-MonitoringOccasionOfPEI associated with the same radio frame.

For determining the first PO for every $N_{UE\_groups}$ consecutive PO(s) with PEI(s) included in the same DCI format, the UE can determine first PO based on one of the following methods: (1) in one method, the PEIs for a group of POs between two consecutive SS/PBCH block bursts are included in the same DCI format. The first PO is the first PO from the group of POs between two consecutive SS/PBCH block bursts; and (2) in another method, $N_{UE\_groups}$ can be determined based on total number of POs, $N_{POs}$, from the serving cell, such that $$N_{UE\_groups} = \frac{N_{POs}}{a},$$

where a is a positive integer. The value for a can be defined in the specification of the system operation. For example, a equals the number of total paging frames (PFs) per paging cycle, and thus $N_{UE\_groups}$ equals the number of POs per PF. Alternatively, a can be provided to a UE by higher layer signaling. The (i_PO+1)th to (i_PO+$N_{UE\_groups}$)th consecutive POs have PEI(s) included in the same DCI format, wherein the first PO has PO index, i_PO satisfies that mod (i_PO, $N_{UE\_groups}$)=0.

A UE can determine the QCL information for the K>=1 PDCCH receptions occasion(s) for PEI from a serving cell based on one of the following methods.

In one embodiment of method, the UE can determine the QCL information the K>=1 PDCCH receptions occasion(s) for PEI based on SS/PBCH blocks transmitted from the serving cell. K equals to the number of $K_{SSB}$ transmitted SS/PBCH blocks per SS/PBCH block burst, and the kth PDCCH receptions occasion from the K>=1 PDCCH receptions occasion(s) and the kth transmitted SS/PBCH blocks per SS/PBCH block burst are quasi co-located (QCLed) with respect to a QCL type or Doppler spread, Doppler shift, average gain, average delay, delay spread, and, when applicable, spatial Rx parameters. For example, the QCL type can be 'QCL-TypeD' as defined in 3GPP standard specification. Alternatively, the K>=1 PDCCH receptions occasion(s) for PEI can be QCLed with partial of the transmitted SS/PBCH blocks in the burst of SS/PBCH blocks, wherein K<$K_{SSB}$. The UE determines that the kth (k=1, 2, . . . , K) PDCCH reception occasion for PEI from the K>=1 PDCCH receptions occasion(s) for PEI and the $$\left\lceil \frac{k \cdot K}{K_{SSB}} \right\rceil th \; SS/PBCH$$

block from the $K_{SSB}$ SS/PBCH blocks are QCLed with respect to a QCL type or Doppler spread, Doppler shift, average gain, average delay, delay spread, and, when applicable, spatial Rx parameters.

In another embodiment of method, the UE can determine the QCL information the K>=1 PDCCH receptions occasion(s) for PEI based on TRS/CSI-RS resources from the serving cell. There can be $K_{RS}$<=K TRS/CSI-RS occasions with configured RS resources from the serving cell. The UE determines that the kth (k=1, 2, . . . , K) PDCCH reception occasion for PEI from the K>=1 PDCCH receptions occasion(s) for PEI and the $$\left\lceil \frac{k \cdot K_{RS}}{K} \right\rceil th \; TRS/CSI\text{-}RS$$

occasion from the $K_{RS}$ TRS/CSI-RS occasions are QCLed with respect to a QCL type or Doppler spread, Doppler shift, average gain, average delay, delay spread, and, when applicable, spatial Rx parameters. When $K_{RS}$=K, the kth (k=1, 2, . . . , K) PDCCH reception occasion for PEI from the K>=1 PDCCH receptions occasion(s) for PEI and the kth TRS/CSI-RS occasion from the $K_{RS}$=K TRS/CSI-RS occasions are QCLed with respect to a QCL type or Doppler spread, Doppler shift, average gain, average delay, delay spread, and, when applicable, spatial Rx parameters.

In yet another embodiment of method, the UE is provided a TCI state indicates both a RS resource and QCL type for each of the K>=1 PDCCH receptions occasion(s).

In yet another embodiment of method, the UE can determine the QCL information the K>=1 PDCCH receptions occasion(s) for PEI based on QCL information for associated PO(s). K is the number of PDCCH MOs per PO for the associated PO(s). kth PDCCH receptions occasion from the K>=1 PDCCH receptions occasion(s) and the kth PDCCH MO within a PO are QCLed with respect to a QCL type or Doppler spread, Doppler shift, average gain, average delay, delay spread, and, when applicable, spatial Rx parameters.

The configuration for PDCCH based PEI can include any of the following information: (1) a number of PEI(s), N. Candidate values for N can be [1, 2, 3, 4]; (2) a number of $N_{UE\_groups}$ associated with a number of $N_{UE\_groups}$ consecutive POs. Candidate values for $N_{UE\_groups}$ can be [1, 2, 3, 4]; (3) a number of UE subgroups per PO, $N_{UE\_groups}$. Candidate values for $N_{UE\_groups}$ can be any of 1, 2, 3, 4, 5, 6, 7, or 8; (4) a search space set(s) for the DCI format that includes the PEI; (5) a slot offset, $T_{slot}^{offset}$ between the start of the first PDCCH receptions occasion from the K>=1 PDCCH receptions occasion(s) the start of the first PO from the $N_{UE\_groups}$ consecutive PO(s); (6) a bitmap to indicate the index of first symbol for a PEI reception occasion within a slot; (7) a duration in terms of number of symbols of a PDCCH reception occasion for PEI, $N_{symbols}$; (8) one or more CORESET(s) for the PDCCH based PEI. Alternatively, no explicit configuration of CORESET for PDCCH based PEI, the CORESET associated with PDCCH based PEI can be same as the configured CORESET for paging PDCCH reception.

The configuration can be provided to a UE either by higher layer signaling, e.g., in SIB, or in physical layer signal, for example, MIB or PDCCH in PO.

In a first method for determining a search space set for PEI, where the search space set for PEI is the configured search space set for receiving DCI format that includes PEI, the UE determines the search space set for PEI based on a search space set for paging, where the search space set for paging is the configured search space set for receiving DCI format with CRC scrambled by P-RNTI. The search space set for PEI can be a CSS set.

The UE assumes at least one of the following configuration parameter is same for the search space set for PEI and the search space set for paging: (1) one or more associated CORESET(s); (2) PDCCH monitoring periodicity; (3) a PDCCH monitoring pattern within a slot, indicating the first symbol(s) of the CORESET within a slot for PDCCH monitoring; (4) a duration indicating a number of slots that the search space set exists; (5) a number of PDCCH candidates per CCE aggregation level; (6) an indication that search space set is either a CSS set or a USS set; and/or (7) a bitmap to indicate an index of one or more RB sets for the search space set.

The PDCCH monitoring offset of $O_{PEI}$ slots for the search space set for PEI can be derived based on the PDCCH monitoring offset of $O_{Paging}$ slots for the search space set for paging. For example, $O_{PEI}=O_{Paging}-O_{gap}$, where $O_{gap}$ is a positive integer indicating the gap in unit of slots between the start of PDCCH monitoring occasion(s) from the search space set for PEI and the start of PDCCH monitoring occasion(s) from the search space set for paging.

$O_{gap}$ can be determined based on one of the following methods: (1) in one method, $O_{gap}$ is defined in the specification of the system operation, e.g., 10; (2) in another method, $O_{gap}$ is provided to the UE by higher layers, for example, in the configuration of the PDCCH based PEI; and/or (3) in yet another method, $O_{gap}$ can be determined based on information reported from a UE, e.g., a UE capability report or a UE assistance report. In one example, the UE can report a minimum gap, $O_{gap,min}$ to indicate the minimum value for $O_{gap}$ the UE required to receive PDCCH based PEI. The UE assumes $O_{gap} \geq O_{gap,min}$. In another example, the UE can report the value for $O_{gap}$ directly.

In a second method for determining a search space set for PEI, the search space set for PEI can be provided to a UE by higher layer, for example via SIB. The search space set can be a new type of CSS set.

In a third method for determining a search space set for PEI, the search space set for PEI can be Type0-PDCCH CSS set as defined in 3GPP standard specification.

In a fourth method for determining the search space set for PEI reception. The UE can be configured with a type-3 PDCCH CSS set. The UE can monitor the DCI format for PEI, where the DCI format has CRC bits scrambled by a new RNTI or PS-RNTI.

For the configuration of search space set for PDCCH based PEI, the UE can be provided with some restriction on CCE AL(s) for PEI reception. For example, the UE can only be configured with CCE ALs to be 4 or 8 for PDCCH candidates configured for DCI formats for PEI reception.

A second embodiment of this disclosure considers PEI via a RS. The PEI indicates whether or not a group of UEs may monitor PDCCH in a PO. The type of PEI is referred as RS based PEI in this disclosure. The applicable UEs can be either in RRC_IDLE/INACTIVE state or RRC_CONNECTED state with configured PO to monitor. The RS based PEI is received by the UE in DL BWP same as the DL BWP for PO.

A UE can be provided with a configuration for RS based PEI, such that a PEI is indicated by presence of a RS. The presence of the RS can indicate the UE to monitor PDCCHs in the associated PO. If the UE does not detect a RS based PEI, the UE skips PDCCHs reception or monitoring in the associated PO; otherwise, the UE monitors PDCCHs in the associated PO.

A UE can be provided with a configuration for RS based PEI, such that a PEI is indicated by presence of a RS. The presence of the RS can indicate the UE to monitor PDCCHs in the associated PO. If the UE does not detect a RS based PEI, the UE skips PDCCHs reception or monitoring in the associated PO; otherwise, the UE monitors PDCCHs in the associated PO.

Figure 7:
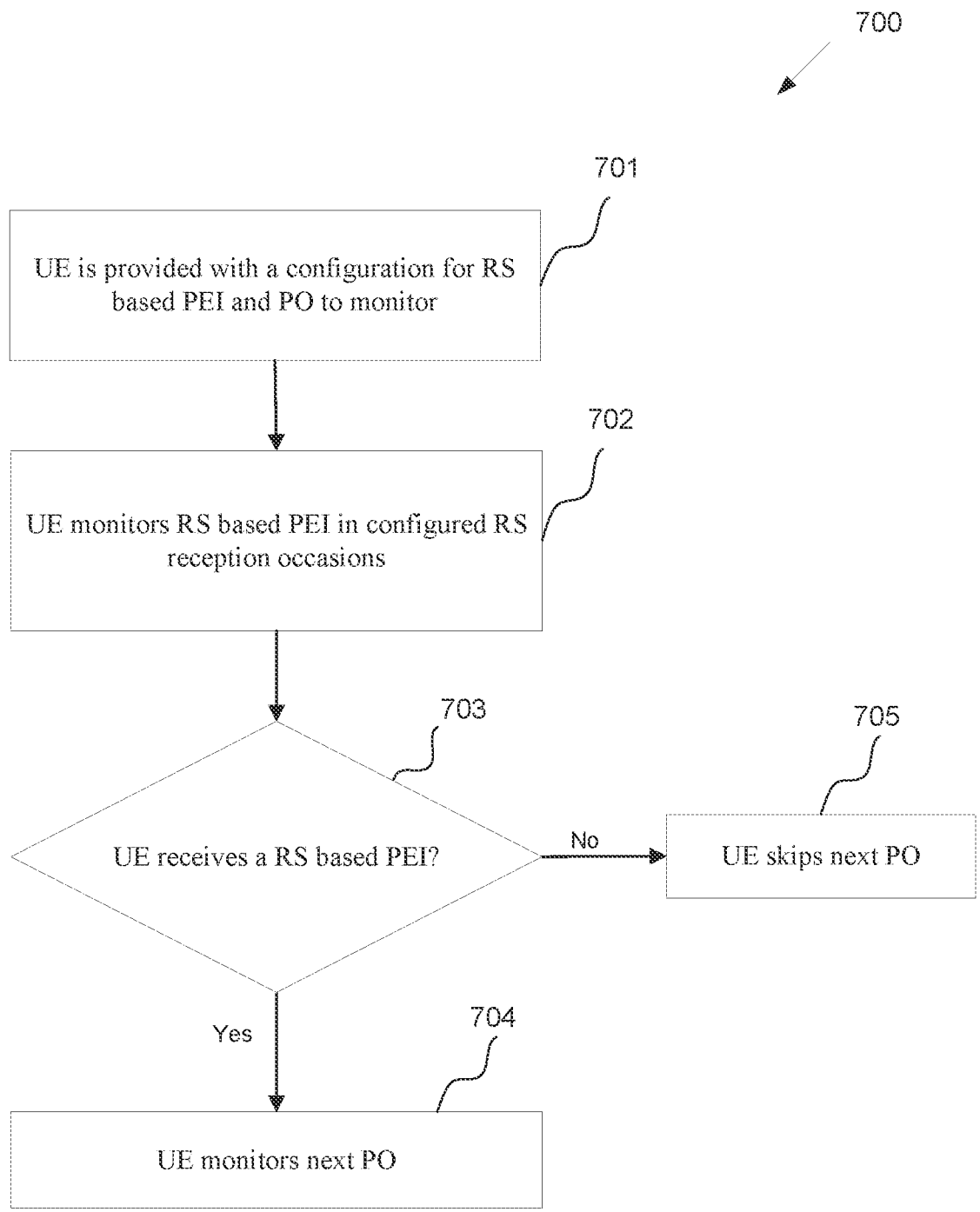
FIG. 7 illustrate a flowchart of a UE method for configuration of RS based PEI and PO according to embodiments of the present disclosure.

FIG. 7 illustrates a flowchart of a UE method 700 for configuration of RS based PEI and PO according to embodiments of the present disclosure. The UE method 700 as may be performed by a UE (e.g., 111-116 as illustrated in FIG. 1). An embodiment of the UE method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, a UE is provided with a configuration for RS based PEI and PO to monitor in step 701. The UE monitors RS based PEI in configured RS monitoring occasions according to the configuration in step 702. The UE determines whether or not the UE receives a RS based PEI in step 703. If the UE receives a RS based PEI, the UE monitors PDCCHs in the next PO in step 704; otherwise, the UE skips PDCCH reception in the next PO in step 705.

In a first approach for RS based PEI, a RS based PEI can be transmitted from a gNB to one or more groups of UEs, wherein a group of UEs monitor PDCCHs in a single PO. The RS based PEI can be associated with $N_{UE\_groups} \geq 1$ consecutive POs, where $N_{UE\_groups}$ is the number of UE groups. The gNB transmits the RS based PEI as long as there is at least one UE from the $N_{UE\_groups}$ of UEs has PDCCH reception in one of the PO from the $N_{UE\_groups}$ consecutive POs.

In a second approach for RS based PEI, a group of UEs that monitor PDCCHs in a PO can be further divided into $N_{subgroups}^{PO} \geq 1$ UE subgroups according to a UE ID used for determining the PO to monitor. An RS based PEI can be transmitted from a gNB to a UE subgroup. A gNB transmits the RS based PEI as long as there is at least one UE from the UE subgroup has PDCCH reception in an associated PO. The $N_{subgroups}^{PO}$ RS based PEIs for the $N_{subgroup}^{PO}$ UE subgroups associated with same PO can be transmitted based on one of the following methods.

In one method, the $N_{subgroups}^{PO}$ RS based PEIs can be transmitted over the same time or frequency domain resources. The sequence generation for different RS based PEI are different. For example, different cyclic shift or initial condition.

In another method, the $N_{subgroups}^{PO}$ RS based PEIs can be transmitted over the same time domain resources, but different frequency domain resources.

In yet another method, the $N_{subgroups}^{PO}$ RS based PEIs can be transmitted over the same frequency domain resources, but different time domain resources.

In yet another method, the $N_{subgroups}^{PO}$ RS based PEIs can be transmitted with different RE mapping pattern. For example, when CSI-RS/TRS based PEI is considered, only a single antenna port is needed for the transmission of RS based PEI. The RE mappings corresponding to different antenna ports of CSI-RS resources can be reinterpreted by UEs to indicate PEI for multiple UE sub-groups. In another method, a UE sub-grouping of PEI can be achieved through different time or frequency resources allocations for RS based I-WUS. In yet another method, N>1 bits of PEI can also be indicated based on sequence generation, such as cyclic shift or initial condition of Gold-sequence for SSS-like I-WUS.

A UE can be provided with K>=1 RS receptions occasion(s) for RS based PEI per PEI reception.

For determines location of the K>=1 RS receptions occasion(s) for RS based PEI, the offset UE is provided with a slot offset, $T_{slot}^{offset}$, between the start of the first RS receptions occasion from the K>=1 RS receptions occasion(s) the start of the first PO from the $N_{UE\_groups}$ consecutive PO(s). The K>=1 RS receptions occasion(s) are within $N_{slots} \leq K$ consecutive slots starting from slot with index $n_{start,slot}^{PEI}$, such that $n_{start,slot}^{PEI}=n_{start,slot}^{PO\_first}-$ $T_{slot}^{offset}$, where $n_{start,slot}^{PO\_first}$ is slot index for the first slot of the first PO from the $N_{UE\_groups}$ consecutive PO(s). The UE can be provided with $N_{occasions}^{slot} \geq 1$ first symbol(s) of RS receptions occasion(s) for PEI. The K>=1 RS receptions occasion(s) are the $N_{slots}$ consecutive slots starting from slot $n_{start,slot}^{PEI}$, where $$n_{start,slot}^{PEI} = \left\lceil \frac{K}{N_{occasions}^{slot}} \right\rceil.$$

For example, the UE is provided with a bitmap, where an index of a bit from the bitmap with value of "1" indicates the index of the first symbol for a RS reception occasion. For another example, $N_{occasions}^{slot}=1$, and each of the K>=1 RS receptions occasion(s) is N consecutive symbols starting from a symbol with index $n_{symbol}$ within a slot, for example, $n_{symbol}=0$. $N_{symbols}$ is determined based on a configuration of RS based PEI.

For determining the first PO for every $N_{UE\_groups}$ consecutive PO(s) that are associated with the same RS based PEI, the UE can determine first PO based on one of the following methods.

In one method, a RS based PEI is for a group of POs between two consecutive SS/PBCH block bursts. The first PO is the first PO from the group of POs between two consecutive SS/PBCH block bursts.

In another method, $N_{UE_{groups}}$ can be determined based on total number of POs, $N_{POs}$, from the serving cell, such that $$N_{UE_{groups}} = \frac{N_{POs}}{a},$$

where a is a positive integer. The value for a can be defined in the specification of the system operation. For example, a equals the number of total PFs per paging cycle, and $N_{UE_{groups}}$ equals the number of POs for a PF. Alternatively, a can be provided to a UE by higher layer signaling. The (i_PO+1)th to (i_PO+$N_{UE_{groups}}$)th consecutive POs are mapped to the same PEI, wherein the first PO has PO index, i_PO satisfies that mod (i_PO, $N_{UE_{groups}}$)=0.

A UE can determine the QCL information for the K>=1 RS receptions occasion(s) for PEI from a serving cell based on one of the following methods.

In one method, the UE can determine the QCL information the K>=1 RS receptions occasion(s) for PEI based on SS/PBCH blocks transmitted from the serving cell. The UE assume K equals the number of $K_{SSB}$ transmitted SS/PBCH blocks per SS/PBCH block burst, and the kth RS receptions occasion from the K>=1 RS receptions occasion(s) and the kth transmitted SS/PBCH blocks per SS/PBCH block burst are QCLed with respect to a QCL type or Doppler spread, Doppler shift, average gain, average delay, delay spread, and, when applicable, spatial Rx parameters. For example, the QCL type can be "QCL-TypeD" as defined in 3GPP standard specification.

Alternatively, the K>=1 RS receptions occasion(s) for PEI can be QCLed with partial of the transmitted SS/PBCH blocks in the burst of SS/PBCH blocks, wherein K<$K_{SSB}$. The UE determines that the kth (k=1, 2, ..., K) RS reception occasion for PEI from the K>=1 RS receptions occasion(s) for PEI and the $$\left\lceil \frac{k \cdot K}{K_{SSB}} \right\rceil th \ SS/PBCH$$

block from the $K_{SSB}$ SS/PBCH blocks are QCLed with respect to a QCL type or Doppler spread, Doppler shift, average gain, average delay, delay spread, and, when applicable, spatial Rx parameters.

In another method, the UE can determine the QCL information the K>=1 RS receptions occasion(s) for PEI based on TRS/CSI-RS resources from the serving cell. There can be $K_{RS}$<=K TRS/CSI-RS occasions with configured RS resources from the serving cell. The UE determines that the kth (k=1, 2, ..., K) RS reception occasion for PEI from the K>=1 RS receptions occasion(s) for PEI and the $$\left\lceil \frac{k \cdot K_{RS}}{K} \right\rceil th \ TRS/CSI-RS$$

occasion from the $K_{RS}$ TRS/CSI-RS occasions are QCLed with respect to a QCL type or Doppler spread, Doppler shift, average gain, average delay, delay spread, and, when applicable, spatial Rx parameters. When $K_{RS}$=K, the kth (k=1, 2, ..., K) RS reception occasion for PEI from the K>=1 RS receptions occasion(s) for PEI and the kth TRS/CSI-RS occasion from the $K_{RS}$=K TRS/CSI-RS occasions are QCLed with respect to a QCL type or Doppler spread, Doppler shift, average gain, average delay, delay spread, and, when applicable, spatial Rx parameters.

In yet another method, the UE is provided a TCI state indicates both a RS resource and QCL type for each of the K>=1 RS receptions occasion(s).

The configuration for RS based PEI can includes any of the following information: (1) a number of $N_{UE_{groups}}$ associated with a number of $N_{UE_{groups}}$ consecutive POs. Candidate values for $N_{UE_{groups}}$ can be [1, 2, 3, 4]; (2) a number of UE subgroups per PO, $N_{UE_{groups}}$. Candidate values for $N_{UE_{groups}}$ can be [1, 2, 3, 4]; (3) a slot offset, $T_{slot}^{offset}$, between the start of the first RS receptions occasion from the K>=1 RS receptions occasion(s) the start of the first PO from the $N_{UE_{groups}}$ consecutive PO(s); (4) a bitmap to indicate the index of first symbol for a PEI reception occasion within a slot; and/or (5) a duration in terms of number of symbols of a RS reception occasion for PEI, $N_{symbols}$.

The configuration can be provided to a UE either by higher layer signaling, e.g., in SIB, or in physical layer signal, for example, MIB or PDCCH in PO.

The RS can be generated from any of the following methods: (1) in one method, the RS is a CSI-RS; (2) in another method, the RS is SSS; and (3) in yet another method, the RS is PN sequence.

A third embodiment of this disclosure considers a unified design for PDCCH based and RS based PEI. The PDCCH based PEI is defined in the embodiment I of this disclosure, while RS based PEI is defined in the embodiment II of this disclosure.

A UE can be provided with configuration for both RS based PEI and PDCCH based PEI. Any of the following configuration parameters can be same for PDCCH based PEI and RS based PEI: (1) a number of $N_{UE_{groups}}$ associated with a number of $N_{UE_{groups}}$ consecutive POs. Candidate values for $N_{UE_{groups}}$ can be [1, 2, 3, 4]; (2) a number of UE subgroups per PO, $N_{UE_{groups}}$. Candidate values for $N_{UE_{groups}}$ can be [1, 2, 3, 4]; (3) a slot offset, $T_{slot}^{offset}$ between the start of the first PEI receptions occasion from the K>=1 PEI receptions occasion(s) the start of the first PO from the $N_{UE_{groups}}$ consecutive PO(s); (4) a bitmap to indicate the index of first symbol for a PEI reception occasion within a slot; and/or (5) a duration in terms of number of symbols of a PEI reception occasion, $N_{symbols}$.

The configuration can be provided to a UE either by higher layer signaling, e.g., in SIB, or in physical layer signal, for example, MIB or PDCCH in PO.

The UE expects the same method for determining the first PO for every $N_{UE\_groups}$ consecutive PO(s) that are associated with the same RS based PEI or for PDCCH based PEIs included in the same DCI format.

The UE expects the same method for determine the QCL information for the K>=1 PEI receptions occasion(s), based on one of the following methods, where a PEI reception occasion can be either a PDCCH based PEI reception occasion or a RS based PEI reception occasion.

In one method, the UE can determine the QCL information the K>=1 PEI receptions occasion(s) based on SS/PBCH blocks transmitted from the serving cell. The UE assume K equals the number of $K_{SSB}$ transmitted SS/PBCH blocks per SS/PBCH block burst, and the kth PEI receptions occasion from the K>=1 PEI receptions occasion(s) and the kth transmitted SS/PBCH blocks per SS/PBCH block burst are QCLed with respect to a QCL type or Doppler spread, Doppler shift, average gain, average delay, delay spread, and, when applicable, spatial Rx parameters. For example, the QCL type can be "QCL-TypeD" as defined in 3GPP standard specification.

Alternatively, the K>=1 PEI receptions occasion(s) can be QCLed with partial of the transmitted SS/PBCH blocks in the burst of SS/PBCH blocks, wherein K<$K_{SSB}$. The UE determines that the kth (k=1, 2, . . . , K) PEI reception occasion from the K>=1 PEI receptions occasion(s) and the $$\left\lceil \frac{k \cdot K}{K_{SSB}} \right\rceil th \ SS/PBCH$$

block from the $K_{SSB}$ SS/PBCH blocks are QCLed with respect to a QCL type or Doppler spread, Doppler shift, average gain, average delay, delay spread, and, when applicable, spatial Rx parameters.

In another method, the UE can determine the QCL information the K>=1 PEI receptions occasion(s) based on TRS/CSI-RS resources from the serving cell. There can be $K_{RS}$<=K TRS/CSI-RS occasions with configured RS resources from the serving cell. The UE determines that the kth (k=1, 2, . . . , K) PEI reception occasion from the K>=1 PEI receptions occasion(s) and the $$\left\lceil \frac{k \cdot K_{RS}}{K} \right\rceil th \ TRS/CSI-RS$$

occasion from the $K_{RS}$ TRS/CSI-RS occasions are QCLed with respect to a QCL type or Doppler spread, Doppler shift, average gain, average delay, delay spread, and, when applicable, spatial Rx parameters. When $K_{RS}$=K, the kth (k=1, 2, . . . , K) PEI reception occasion from the K>=1 PEI receptions occasion(s) and the kth TRS/CSI-RS occasion from the $K_{RS}$=K TRS/CSI-RS occasions are QCLed with respect to a QCL type or Doppler spread, Doppler shift, average gain, average delay, delay spread, and, when applicable, spatial Rx parameters.

In yet another method, the UE is provided a TCI state indicates both a RS resource and QCL type for each of the K>=1 PEI receptions occasion(s).

Figure 8:
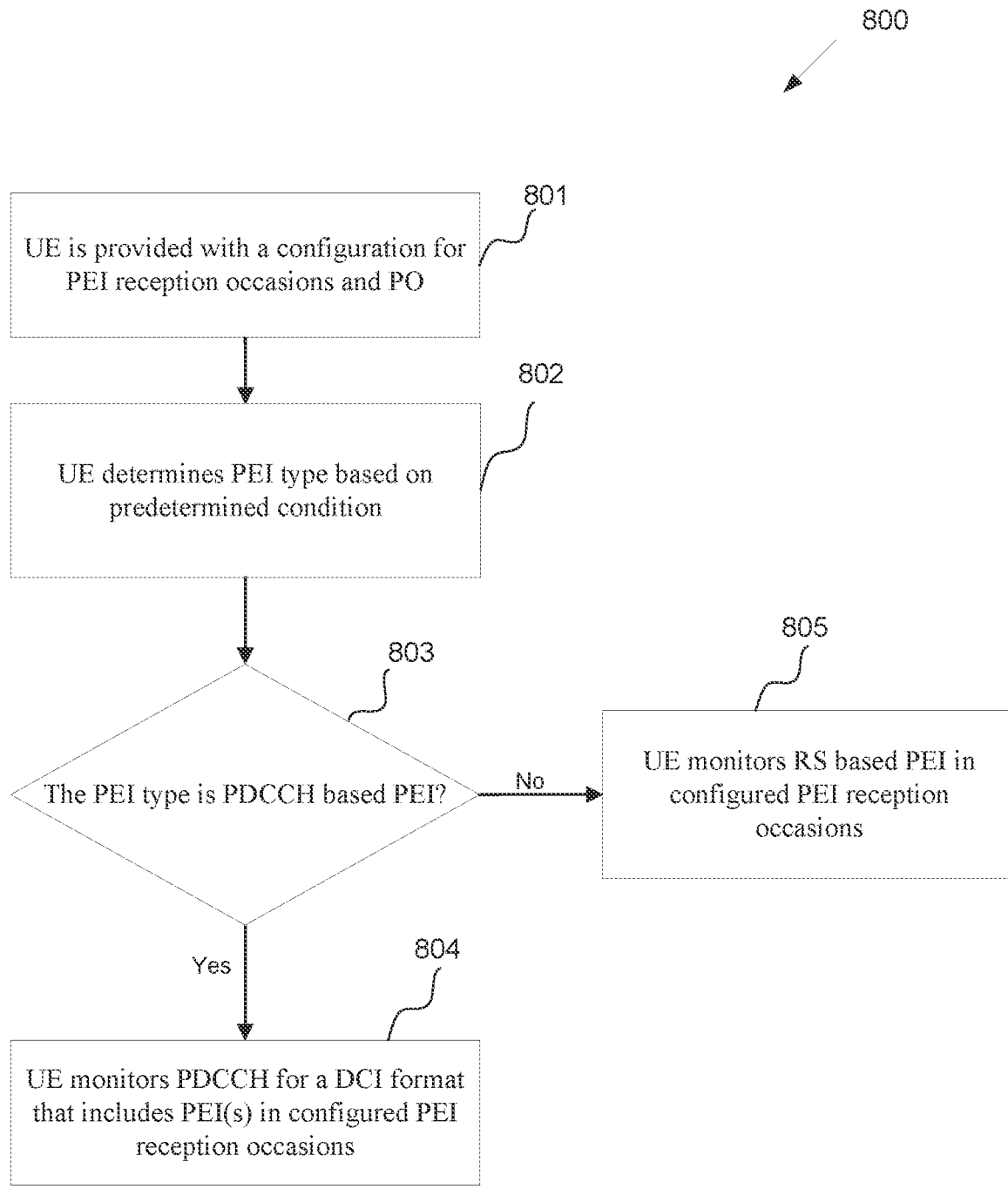
FIG. 8 illustrate a flowchart of a UE method for configuration of PEI reception occasions and PO according to embodiments of the present disclosure.

FIG. 8 illustrates a flowchart of a UE method 800 for configuration of PEI reception occasions and PO according to embodiments of the present disclosure. The UE method 800 as may be performed by a UE (e.g., 111-116 as illustrated in FIG. 1). An embodiment of the UE method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, a UE is provided with a configuration for PEI reception occasions and PO in step 801. The PEI reception occasions are applicable for both RS based PEI and RS based PEI. The UE determines PEI type based on predetermined condition in step 802. The UE determines whether or not the PEI type is PDCCH based PEI in step 803. If the PEI is PDCCH based PEI, the UE then monitors PDCCH for a DCI format that includes PEI(s) in configured PEI reception occasions in step 804; otherwise, the UE monitors RS based PEI in configured PEI reception occasions in step 805.

In a first method for determining the PEI type, a UE can be provided with a configuration of PEI type by higher layers. For example, a binary bit can be used to indicate PDCCH based PEI or RS based PEI. When the configuration of PEI type is not available, the UE assumes a default PEI type. The default PEI type can be either RS based PEI or PDCCH based PEI, or provided to the UE in the configuration.

In a second method for determining the PEI type, a UE can be provided with an indication of PEI type by a physical layer signal/channel. The physical layer signal or channel can be any of the following: (1) in one example, the physical layer signal is a PDCCH in PO, where the PDCCH includes a DCI format with CRC scrambled by P-RNTI. The indication of PEI type can be included in the short message of the DCI format or reserved bits in the DCI format; and/or (2) in another example, the physical layer signal can be PBCH.

For example, a binary bit can be used to indicate PDCCH based PEI or RS based PEI. When the indication of PEI type is not available, the UE assumes a default PEI type. The default PEI type can be either RS based PEI or PDCCH based PEI, or provided to the UE in the configuration.

In a third method for determining the PEI type, a UE can determine the PEI type based on the UE subgroup sizes per PO, $N_{subgroups,0}^{PO}$. If $N_{subgroups}^{PO}$ is larger than a threshold, $N_{subgroups,0}^{PO}$ the UE expects to receive PDCCH based PEI, otherwise the UE expects to receive RS based PEI.

The value for $N_{subgroups,0}^{PO}$ can be determined based on at least one of the following methods: (1) in one method, $N_{subgroups,0}^{PO}$ is defined in the specification of the system operation. For example, $N_{subgroups,0}^{PO}$=1; (2) in another method, $N_{subgroups,0}^{PO}$ is provided to a UE by higher layer(s). For example, in the configuration of PEI via SIB; and (3) in yet another method, $N_{subgroups,0}^{PO}$ is determined based on report from a UE as UE capability or UE assistance information. In one example, the UE reports maximum or minimum applicable value for $N_{subgroups,0}^{PO}$. In another example, the UE reports value for $N_{subgroups,0}^{PO}$ explicitly.

In a fourth method for determining the PEI type, a UE can determine the PEI type based on the UE groups sizes or number of POs with PEI included in the L1 signal/channel, $N_{UE\_groups}$. If $N_{UE\_groups}$ is larger than a threshold, $N_{UE\_groups,0}$, the UE expects to receive PDCCH based PEI, otherwise the UE expects to receive RS based PEI.

The value for $N_{UE_{groups},0}$ can be determined based on at least one of the following methods: (1) in one method, $N_{UE_{groups},0}$ is defined in the specification of the system operation. For example, $N_{UE_{groups},0}=1$; (2) in another method, $N_{UE_{groups},0}$ is provided to a UE by higher layer(s). For example, in the configuration of PEI via SIB; and (3) in yet another method, $N_{UE_{groups},0}$ is determined based on report from a UE as UE capability or UE assistance information. In one example, the UE reports maximum or minimum applicable value for $N_{UE_{groups},0}$. In another example, the UE reports value for $N_{UE_{groups},0}$ explicitly.

In a fifth method for determining the PEI type, a UE can determine the PEI type based on the whether or not additional information is transmitted together with PEI in the same L1 signal/channel, when the L1 signal/channel for PEI also configured to include additional information, for example availability for TRS/CSI-RS occasion(s) for IDLE/INACATIVE UEs, the UE expects to receive PDCCH based PEI; otherwise, the UE expects to receive RS based PEI.

A fourth embodiment of this disclosure considers availability indication of TRS/CSI-RS occasions to idle/inactive UEs based on both L1 signaling and/or SIB based signaling.

A UE can be provided with a configuration of TRS/CSI-RS resources applicable to idle/inactive mode UEs, where the configuration is provided to the UE as part of system information (SI) in a PDSCH with CRC bits scrambled by SI-RNTI. The UE is further provided with an availability indication to indicate some resources from the TRS/CSI-RS resources that are available. The UE assumes that the TRS/CSI-RS resources are not available if the UE does not receive any availability indication. The configuration can be a list of up to X>=1 TRS/CSI-RS resource sets, where a TRS/CSI-RS resource set consist of up to Y>=1 TRS/CSI-RS resources, where X/Y is an integer. The value of X can be predetermined.

In one example, X=64. In another example, X is the number of actual transmitted SSBs determined according to ssb-PositionsInBurst in SIB1. In yet another example, X is the size of ssb-PositionsInBurst in SIB1, i.e., the maximum number of SSBs can be transmitted in the serving cell. The value of Y can be predetermined. In one example, Y=4. In another example, Y=2 for FR1, while Y=4 for FR2.

A UE can be provided with a time duration, $T_{valid}$, to determine a valid period for an availability indication provided either by a physical layer signal/channel or by higher layer, wherein the UE assume an availability indication is valid for a time duration of $T_{valid}$ from a reference point.

The value of $T_{valid}$ can be configured by higher layer. The time unit for $T_{valid}$ can be any of the following: (1) in a first method, $T_{valid}$ has a unit of one millisecond, where $T_{valid}$ is a number of millisecond. For example, $T_{valid}$ can be configured a timer from higher layer; (2) in a second method, $T_{valid}$ has a unit of one second, one radio frame (rf) one slot or one symbol. For example, $T_{valid}$ can be configured to be any of 32rf/64rf/128rf/256rf/512rf/1024rf; and/or (3) in a third method, $T_{valid}$ is a number of DRX cycles for paging, where a UE is configured to monitor one PO per DRX cycle. The time duration of the valid period can be determined as $T_{valid}*T_{pagingCycle}$, where $T_{pagingCycle}$ is the time duration of a DRX cycle for paging. The applicable value for $T_{valid}$ is a positive integer. For example, it can be configured to be any of 1, 2, . . . , 10.

For configuration of $T_{valid}$, one of the following methods can be used: (1) in a first method, $T_{valid}$ is configured for all TRS/CSI-RS resources configured for idle/inactive UEs. In one example, only one $T_{valid}$ is configured; (2) in a first method, $T_{valid}$ is configured per TRS/CSI-RS resources set, where a TRS/CSI-RS resources set is a set of TRS/CSI-RS resources, and a gNB configures one or more TRS/CSI-RS resource set(s) for idle/inactive UEs; (3) in a second method, $T_{valid}$ is configured per a group of TRS/CSI-RS resources sets, where a TRS/CSI-RS resources set is a set of TRS/CSI-RS resources, and a gNB configures multiple TRS/CSI-RS resource sets for idle/inactive UEs; and/or (4) in a second method, $T_{valid}$ is configured per TRS/CSI-RS resource, where the gNB configures multiple TRS/CSI-RS resources for idle/inactive UEs.

For each valid time duration, $T_{valid}$, one or more applicable values can be either defined in the specification of the system operation or provided by higher layer. One of the applicable values is provided to a UE for each valid time duration either by higher layer or by an availability indication.

Alternatively, $T_{valid}$ can be determined implicitly based on one of the following methods.

In a first method, $T_{valid}$ can be a defined determined based on DRX cycle for paging. For example, $T_{valid}$ can be one or more DRX cycle(s), which can be defined in the specification of the system operation. For example, $T_{valid}$ equals one DRX cycle. For another example, $T_{valid}$ is two DRX cycles.

In a second method, $T_{valid}$ can be a defined determined infinity, where a UE assumes an availability indication is always valid before the UE receive next availability indication. For example, when the UE receives an availability indication in a SIB, the UE assumes the availability indication is always valid before the UE receives another availability indication based on SI update of the corresponding SIB.

In a third method, $T_{valid}$ is fixed and with value defined in the specification of the system operation in unit of one second, or one millisecond, or one slot. For example, $T_{valid}=1$ s.

The implicit method for determining $T_{valid}$ can be supported when the UE does not receive explicit configuration of $T_{valid}$.

The reference point can be determined based on one of the following methods.

In a first method, the reference point is the start time of current DRX cycle for paging when a UE receives the availability indication. The start time of current DRX cycle can be the first SFN/slot/subframe of the current DRX cycle for paging.

In a second method, the reference point is the start time of next DRX cycle for paging when a UE receives the availability indication. The start time of next DRX cycle can be the first SFN/slot/subframe of the next DRX cycle for paging.

In a third method, the reference point is the time when a UE receives the availability indication.

In a fourth method, the reference point is start of current frame, i.e., SFN when a UE receives the availability indication.

In a fifth method, the reference point is end of current frame or start of next frame when a UE receives the availability indication.

In a sixth method, the reference point is start of current subframe when a UE receives the availability indication.

In a seventh method, the reference point is end of current subframe or start of next subframe when a UE receives the availability indication.

In an eighth method, the reference point is start of current PO when a UE receives the availability indication.

In a ninth method, the reference point is end of current PO or start of next PO when a UE receives the availability indication.

When more than one L1 based signaling are supported for providing TRS availability indication, for example both DCI format 2_7 with CRC scrambled by PEI-RNTI and DCI format 1_0 with CRC scrambled by P-RNTI, how to enable/disable the L1 based signaling can be determined based on validity duration based on the following rule: TRS availability indication field is present in DCI format 2_7 (if configured) with CRC scrambled by PEI-RNTI and DCI format 1_0 with CRC scrambled by P-RNTI if validity duration is no less than X; Otherwise TRS availability indication field is only present in DCI format 2_7 (if configured) with CRC scrambled by PEI-RNTI. X is an applicable value for the validity duration. In one example, X=2 default DRX cycle for paging. In another example, X=1 default DRX cycle for paging.

When both availability indications a physical layer signal/channel and by higher layer are supported, a UE can be provided with separate $T_{valid}$ for physical layer signal/channel availability indication and higher layer based availability indication. Alternatively, a UE can be provided with a single $T_{valid}$ only for physical layer signal/channel availability indication.

In one example for the content of an availability indication by higher layer or physical layer signal/channel, the availability indication can be a number of codepoints or a bitmap to indicate available RS resources from the TRS/CSI-RS resources configured to idle/inactive UEs, where a codepoint or bit can indicate one of the following methods.

In a first method, a bit or codepoint is associated with all TRS/CSI-RS resources configured for idle/inactive UEs. Only one bit is needed, where value "0"/"1" of the bit, indicates whether or not all configured TRS/CSI-RS resources are available.

In a second method, a bit or codepoint is associated with a TRS/CSI-RS resources set, where a TRS/CSI-RS resources set is a set of TRS/CSI-RS resources, and one or more TRS/CSI-RS resources sets can be configured for idle/inactive UEs. A bit with value "0"/"1" indicates whether or not RS resources from the corresponding TRS/CSI-RS resources set are available. Alternatively, two codepoints are mapped to a TRS/CSI-RS resources set, wherein one indicates RS resources from the corresponding TRS/CSI-RS resources set are available, and the other indicates the RS resources from the corresponding TRS/CSI-RS resources set are not available.

In a third method, a bit or codepoint is associated with a group of one or more TRS/CSI-RS resources sets, where a TRS/CSI-RS resources set is a set of TRS/CSI-RS resources, and one or more TRS/CSI-RS resources sets can be configured for idle/inactive UEs. A bit with value "0"/"1" indicates whether or not corresponding group of TRS/CSI-RS resources sets are available. Alternatively, two codepoints are mapped to a group of TRS/CSI-RS resources sets, wherein one indicates the RS resources from the corresponding group of TRS/CSI-RS resources sets are available, and the other indicates the RS resources from the corresponding group of TRS/CSI-RS resources sets are not available.

Any of the following methods can be supported for determining the size of the he availability indication, in terms of $N_{bits}$ bits, where $N_{bits}=0, 1, \ldots N_{max}$.

In a first method, a UE can be provided with a configuration of $N_{bits}$ by higher layer, e.g., SIB. When each bit of the availability indication is associated with a group of one or more TRS/CSI-RS resource sets, the UE can determine the (i+1)th bit is associated with $$\left(\left\lceil \frac{N_{TRS_{sets}}}{N_{bits}} \right\rceil \cdot i + 1\right)th\ TRS/CSI\text{-}RS$$

resource sets to $$\left(\left\lceil \frac{N_{TRS_{sets}}}{N_{bits}} \right\rceil \cdot (i+1)\right)th\ TRS$$

resource sets if configured, where $N_{TRS_{sets}}$ is the total number of TRS/CSI-RS resource sets configured to the UE or $N_{TRS_{sets}}$ is the total number of TRS/CSI-RS resource sets that configured with the same QCL reference/assumptions as the L1 signal/channel that carries the availability indication, and i=0, ..., $N_{bits}-1$.

In a second method, $N_{bits}$ can be predetermined. In one example, $N_{bits}=\min(N_{max}, N_{TRS\_sets})$, where $N_{TRS_{sets}}$ is the total number of TRS/CSI-RS resource sets configured to the UE, or $N_{TRS_{sets}}$ is the total number of TRS/CSI-RS resource sets that configured with the same QCL reference/assumptions as the L1 signal/channel that carries the availability indication.

$N_{max}$ can be up to 6, for example for unshared spectrum channel. $N_{max}$ can be up to 8, for example for shared spectrum channel.

The UE can still receive the physical layer signal/channel that configured with the availability indication field during a valid duration for an availability indication the UE received before. However, the UE may not expect to receive inconsistent availability indication in the physical layer signal/channel during the valid duration. In one method to avoid the inconsistent the availability indication during the valid duration, the UE only applies the availability indication when the availability indication indicates the availability for at least one TRS/CSI-RS resource or TRS/CSI-RS resource set; otherwise, the UE can ignore the availability indication. For example, when the availability indication is a bitmap, where a bit of "1" indicates the associated TRS/CSI-RS resources are available, the UE applies the availability indication if the bitmap has at least one bit with value of "1"; otherwise, the UE ignore the availability indication when the bitmap has all "0"s.

In another example for the content of an availability indication by higher layer or physical layer signal/channel, the availability indication can be a number of codepoints or a bitmap to indicate available valid time duration(s), $T_{valid}$, for associated TRS/CSI-RS resources configured to idle/inactive UEs, where a codepoint or bit can indicate one of the following methods.

In a first method, a codepoint is associated with an applicable value to a valid time duration, $T_{valid}$, applicable to all TRS/CSI-RS resources configured for idle/inactive UEs. Multiple applicable values for the valid time duration can be either defined in the specification of the system operation or configured by higher layer, and the codepoint indicates one of the multiple applicable values. The number of codepoints equals to the number of applicable values for the time duration.

In a second method, a codepoint is associated with an applicable value to a valid time duration, $T_{valid}$, applicable to a TRS/CSI-RS resources set, where a TRS/CSI-RS resources set is a set of TRS/CSI-RS resources, and one or more TRS/CSI-RS resources sets can be configured for idle/inactive UEs. Multiple applicable values for the valid time duration can be either defined in the specification of the system operation or configured by higher layer per TRS/CSI-RS resource set, and the codepoint indicates one of the multiple applicable values. The number of codepoints, $N=N_{RS\ sets}*N_{timers}^{RS\ sets}$, where $N_{RS\ sets}$ is the number of TRS/CSI-RS resources sets and $N_{timers}^{RS\ sets}$ is the number of applicable values for each valid time duration, $T_{valid}$, associated with a TRS/CSI-RS resources set.

In a third method, a codepoint is associated with an applicable value to a valid time duration, $T_{valid}$, applicable to a group of one or more TRS/CSI-RS resources set(s), where a TRS/CSI-RS resources set is a set of TRS/CSI-RS resources, and multiple TRS/CSI-RS resources sets can be configured for idle/inactive UEs. Multiple applicable values for the valid time duration can be either defined in the specification of the system operation or configured by higher layer per TRS/CSI-RS resource set, and the codepoint indicates one of the multiple applicable values. The number of code points, $N=N_{RS\ sets\ group}*N_{timers}^{RS\ sets\ group}$, where $N_{RS\ sets\ group}$ is the number of groups of TRS/CSI-RS resources sets and $N_{timers}^{RS\ sets\ group}$ is the number of applicable values for each valid time duration, $T_{valid}$, associated with a group of TRS/CSI-RS resources sets.

When the content of an availability indication only include explicit indication of available valid time duration (s), $T_{valid}$, the UE derives the available RS resources implicitly, wherein the UE assumes the TRS/CSI-RS resources associated with the corresponding valid time duration with non-zero applicable value indicated by the availability indication are available.

In a first approach for providing the availability indication, the availability indication can be provided by a physical layer signal or an RS common for PEI as specified in Embodiment I, II, or III and the availability indication. For the RS based signaling, a UE is provided with a configuration of multiple RS resources. In one example, the multiple RS resources can be a pool of multiple sequences, which are allocated with same time and frequency channel resources for transmission.

In another example, the multiple RS resources can be multiple frequency domain multiplexed (FDMed) RS resources allocated with different frequency domain channel resources. In yet another example, the multiple RS resources can be multiple time domain multiplexed (TDMed) RS resources allocated with different time domain channel resources.

In yet another example, the multiple RS resources can be multiple code domain multiplexed (CDMed) RS resources, where the multiple RS resources are generated from a common sequence multiplied with multiple cover codes that are orthogonal. In this sense, some RS resources can be mapped to codepoints/values associated with availability indication only. For example, a RS resource is mapped to a codepoint to indicate a state of availability/unavailability for all or some of configured TRS/CSI-RS resources.

For another example, a RS resource is mapped to a codepoint to indicate one or more resource/configuration indices that correspond to the available TRS/CSI-RS resources. Some other RS resources can be mapped to PEI only. If the UE decodes a RS resource associated with availability indication, the UE interprets or determines the corresponding availability information for the TRS/CSI-RS resources. The UE can then receive TRS/CSI-RS resources that are indicated to be available based on the availability information. If the UE decodes a RS resource associated with PEI, the UE receives paging PDCCH in next PO, and the UE assume no change regarding the availability information for the TRS/CSI-RS resources.

Figure 9:
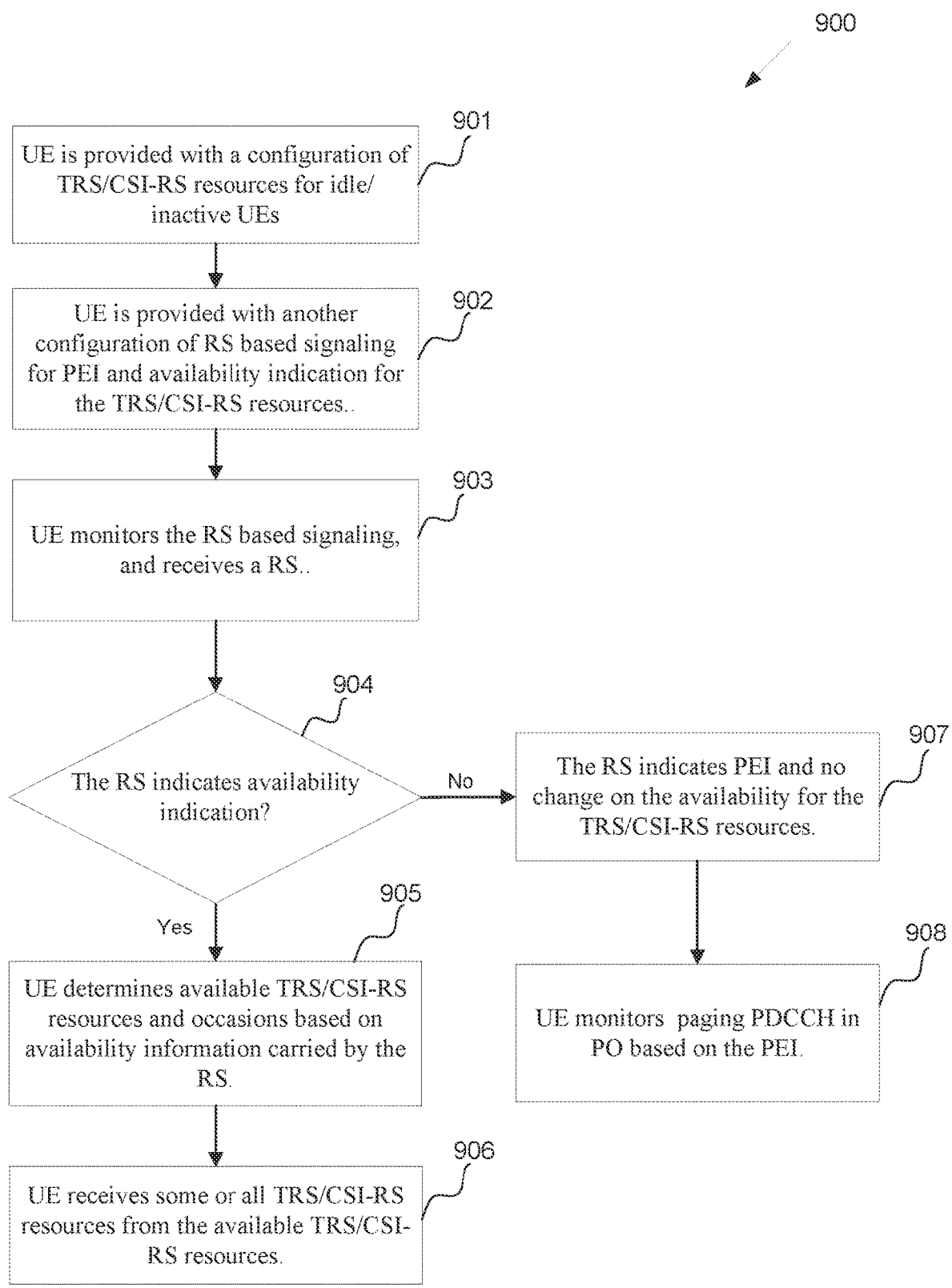
FIG. 9 illustrate a flowchart of a UE method for configuration of TRS/CSI-RS resources according to embodiments of the present disclosure.

FIG. 9 illustrate a flowchart of a UE method 900 for configuration of TRS/CSI-RS resources according to embodiments of the present disclosure. The UE method 900 as may be performed by a UE (e.g., 111-116 as illustrated in FIG. 1). An embodiment of the UE method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates an example of UE behavior to receive common RS based signaling for PEI and availability indication for TRS/CSI-RS resources. As illustrated in FIG. 9, a UE is provided with a configuration of TRS/CSI-RS resources applicable to idle/inactive UEs in step 901. The UE is also provided with another configuration of RS based signaling to provide information about PEI and availability indication for the TRS/CSI-RS resource in step 902. The UE monitors the RS based signaling according to the configuration, and the UE receives a RS in step 903. The UE determines whether or not the RS indicates availability indication for the TRS/CSI-RS resources in step 904. If the RS is mapped to availability information for the TRS/CSI-RS resources, the UE determines available TRS/CSI-RS resources and corresponding reception occasions based on the availability information in step 905.

The UE then receives some or all CSI-RS resources from the available TRS/CSI-RS resources in step 906. For example, the UE only receives some TRS/CSI-RS resources before the next PO for synchronization purpose. If the RS does not indicate availability indication for the TRS/CSI-RS resources, the UE determines that the RS indicates PEI for next PO and there is no change for the availability information regarding the TRS/CSI-RS resources in step 907. For example, if the UE does not receive any availability indication before, or a previous availability indication has been expired, the UE assume the default availability information for the TRS/CSI-RS resources. The default availability information can be all the configured TRS/CSI-RS resources are not available. The UE then monitors paging PDCCH in the next PO in step 908.

In a second approach for providing the availability indication, the availability indication can be provided by a physical layer signal/channel and also by an SIB from higher layer in a serving cell. The UE assumes the same availability indication information is carried in both the SIB and the L1 signal/channel by the serving cell. The UE has the flexibility to receive the availability indication either by the SIB or by the L1 signal/channel.

For example, when the UE enters the serving cell for the first time, the UE receives the availability indication from the SIB together with other system information from higher layer signaling. For another example, when the UE already get all the SI of the serving cell, the UE monitors L1 signal/channel for the availability indication. Since same information of the availability indication may be provided in both the SIB and the L1 signal/channel, the UE does not expect to receive an SI update notification when a NW only updates the availability indication in SI of the serving cell.

For the design of the L1 signal/channel based availability indication. In one example, the L1 signal/channel can be same as the L1 signal/channel for PEI as specified in Embodiment I, II, or III of this disclosure. In another example, the L1 signal/channel can be a PDCCH with CRC scrambled by P-RNTI, denoted as paging PDCCH. The availability indication can be a part of short message in the DCI format carried by the paging PDCCH. Alternatively, the availability indication can be another field in the DCI format carried by the paging PDCCH.

The start of the availability indication in the payload of the L1 signal/channel, e.g., PDCCH, can be determined based on the size of the fields that have the bit location before the availability indication. For paging PDCCH based availability indication, when the short message indicator in the DCI format provided by the paging PDCCH indicates short message only, i.e., short message indicator has value of "10," the UE assumes the start of the availability indication is the next bit after the end of short message.

When the short message indicator in the DCI format provided by the paging PDCCH indicates both scheduling information for paging and short message are present in the DCI format, i.e., short message indicator has value of "11," the UE assumes the start of the availability indication is the next bit after the end of the scheduling information for paging. The UE can expect to receive a paging PDCCH carrying a DCI format with availability indication only, which can be indicated by the reserved bit in the short message indicator, such that the short message indicator has value of "00." Alternatively, the UE does not expect to receive a paging PDCCH carrying a DCI format with availability indication only.

Figure 10:
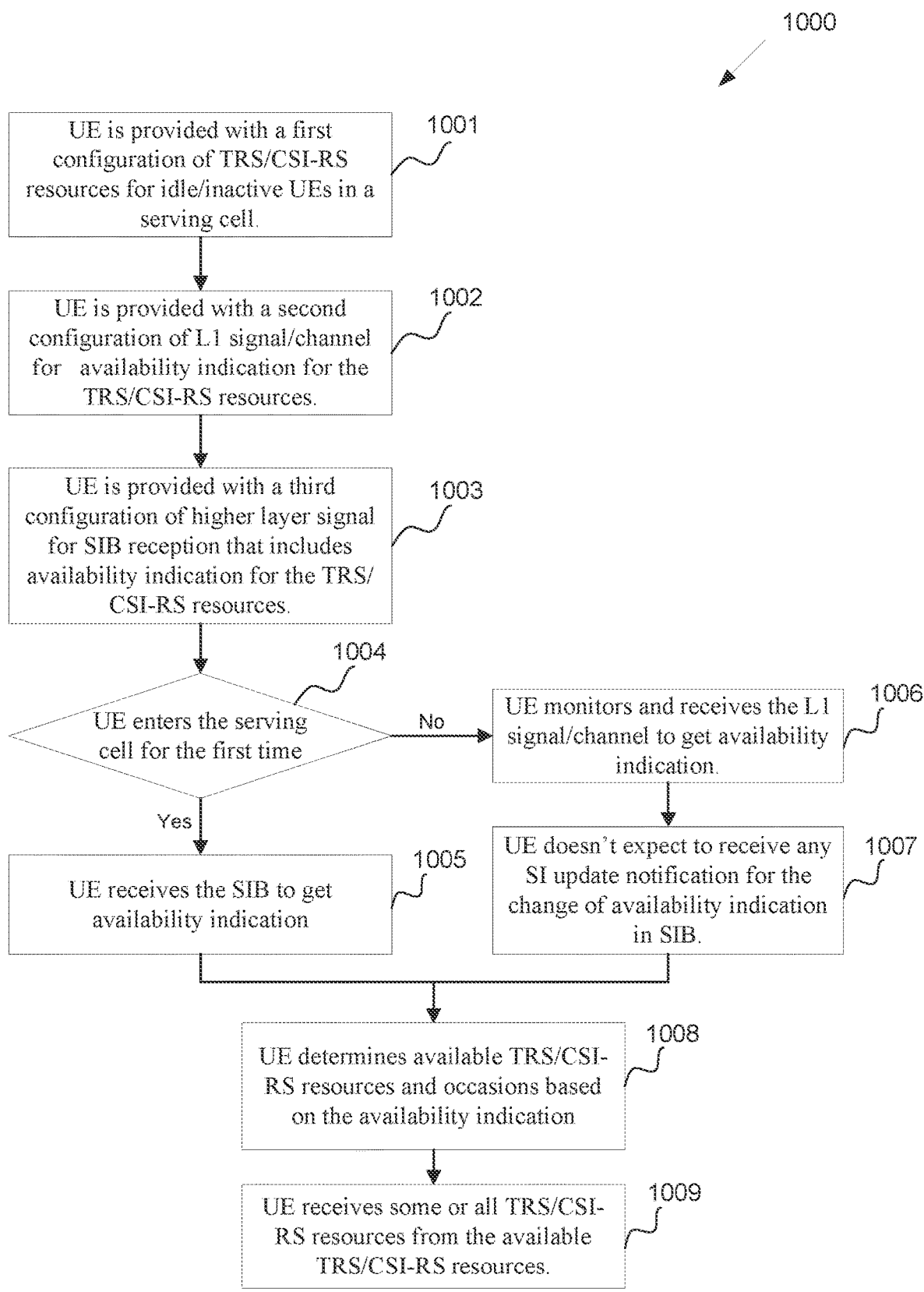
FIG. 10 illustrate another flowchart of a UE method for configuration of TRS/CSI-RS resources according to embodiments of the present disclosure.

FIG. 10 illustrate another flowchart of a UE method 1000 for configuration of TRS/CSI-RS resources according to embodiments of the present disclosure. The UE method 1000 as may be performed by a UE (e.g., 111-116 as illustrated in FIG. 1). An embodiment of the UE method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 illustrates an example of UE behavior to receive PEI based availability indication for TRS/CSI-RS resources. As illustrated in FIG. 10, the UE is provided with a UE is provided with a first configuration of TRS/CSI-RS resources applicable to idle/inactive UEs from a serving cell in step 1001. The UE is also provided with a second configuration of L1 signal/channel for availability indication for the TRS/CSI-RS resources from the serving cell in step 1002. The UE is further provided with a third configuration of higher layer signaling for a SIB reception that includes availability indication for the TRS/CSI-RS resources from the serving cell in step 1003. The UE determines whether or not the UE enters the serving cell for the first time in step 1004. If the UE enters the serving cell for the first time, the UE receives the SIB to get the availability indication in step 1005.

Otherwise, when the UE is not entering the serving cell for the first time, such that the UE already completed receiving all SI of the serving cell, the UE then monitors and receives the L1 signal/channel to get the arability indication in step 1006. The UE assumes the same availability indication may also include in the SIB, and does not expect to receive SI update indication for the change of the availability indication in SIB in step 1007. The UE then determines available TRS/CSI-RS resources and corresponding reception occasions based on the availability information in step 1008. The UE then receives some or all CSI-RS resources from the available TRS/CSI-RS resources in step 1009. For example, the UE only receives some TRS/CSI-RS resources before the next PO for synchronization purpose.

In a third approach for providing the availability indication, a gNB can configure a UE to receive availability indication either by physical layer signal/channel or by higher layer, e.g., in a SIB.

When a UE is configured with availability indication by physical layer signal/channel, the UE assumes that the availability indication by high layer based is disabled. The UE can determine whether or not the availability indication by physical layer signal/channel is enabled based on one of the following methods.

In one method, the UE determines the availability indication by physical layer signal/channel is enabled when the UE is configured with one or more time duration(s), $T_{valid}$, to determine valid period for physical layer based availability indication. otherwise, the UE assumes the availability indication by physical layer signal/channel is disabled when corresponding time duration(s), $T_{valid}$, is/are not configured.

In another method, the UE can be provided with a binary bit by higher layer to indicate whether or not the availability indication by physical layer signal/channel is enabled/disabled.

In yet another method, the UE can determine whether or not physical layer based availability indication is enabled/disabled based on configuration of higher layer based availability indication. When availability indication by higher is enabled, the UE assumes the availability indication by physical layer is disabled. When availability indication by higher is disabled and a gNB configures TRS/CSI-RS resources for idle/inactive UEs, the UE assumes the availability indication by physical layer is enabled.

In one example, a UE can be configured with a binary bit by higher layer to indicate whether or not the availability indication by higher layer is enabled/disabled. For another example, the UE determines the availability indication by higher layer is enabled when the UE is configured with one or more time duration(s), $T_{valid}$, to determine valid period for higher layer based availability indication. otherwise, the UE assumes the availability indication by higher layer signal/channel is disabled when corresponding time duration(s), $T_{valid}$, is/are not configured.

When the UE is provided with configuration of TRS/CSI-RS occasions for idle/inactive UEs, and the UE determines the availability indication by physical layer signal/channel is disabled, the UE assumes that the availability indication by higher layer is enabled.

Figure 11:
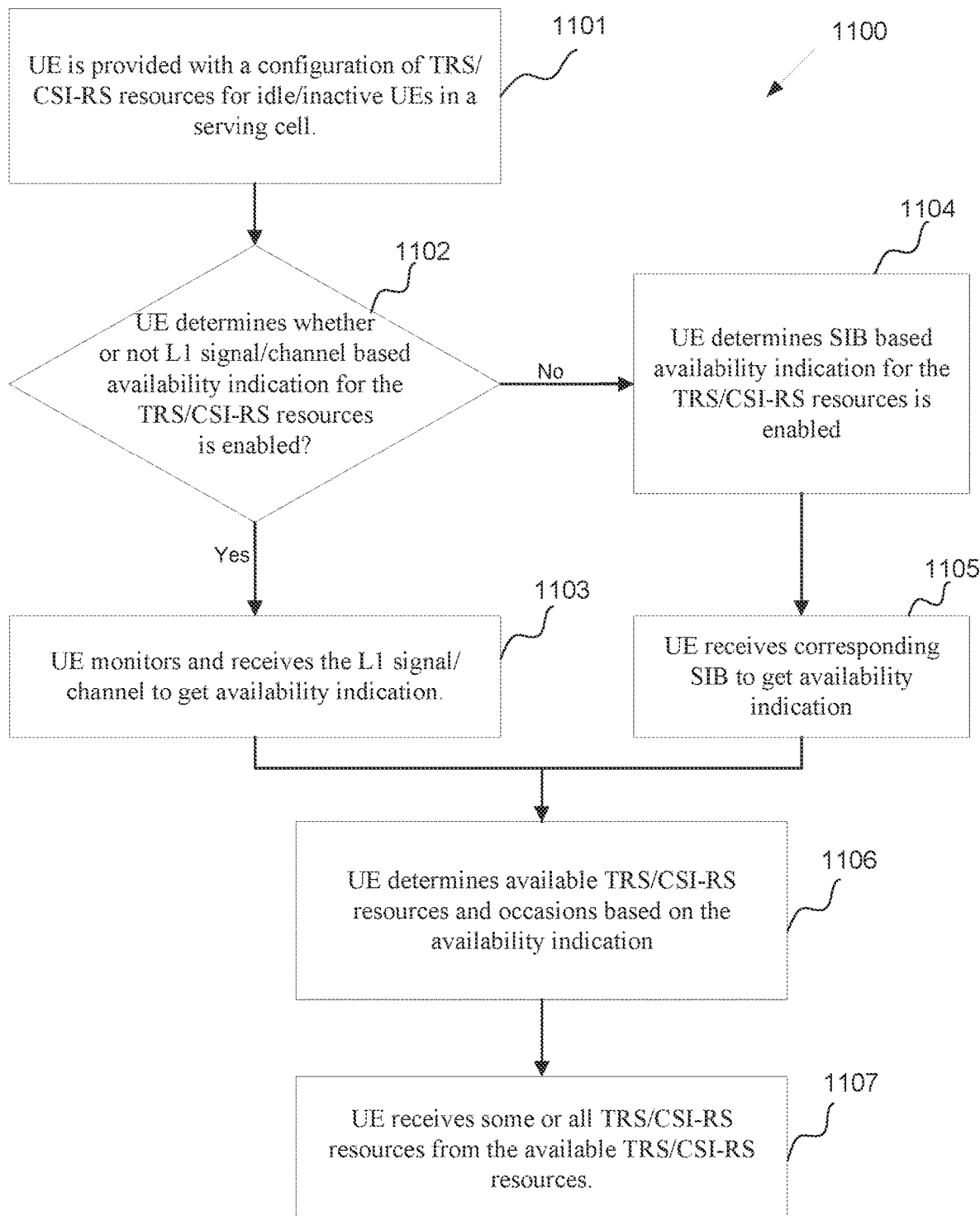
FIG. 11 illustrate yet another flowchart of a UE method for configuration of TRS/CSI-RS resources according to embodiments of the present disclosure.

FIG. 11 illustrate yet another flowchart of a UE method 1100 for configuration of TRS/CSI-RS resources according to embodiments of the present disclosure. The UE method 1100 as may be performed by a UE (e.g., 111-116 as illustrated in FIG. 1). An embodiment of the UE method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates an example of UE behavior to receive PEI based availability indication for TRS/CSI-RS resources. As illustrated in FIG. 11, the UE is provided with a UE is provided with a configuration of TRS/CSI-RS resources applicable to idle/inactive UEs from a serving cell in step 1101. The UE determines whether or not L1 signal/channel based availability indication is enabled based on the configuration in step 1102. If the L1 signal/channel based availability indication is enabled, the UE monitors and receives the L1 signal/channel to get availability indication in step 1103, otherwise, the UE assumes the SIB based availability indication is enabled in step 1104, and receives corresponding SIB to get availability indication in step 1105. The UE then determines available TRS/CSI-RS resources and corresponding reception occasions based on the availability information in step 1106. The UE then receives some or all CSI-RS resources from the available TRS/CSI-RS resources in step 1107.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A terminal in a wireless communication system, the terminal comprising:
    a transceiver configured to:
        receive, from a base station, a higher layer signaling including (i) a configuration of at least one tracking reference signal (TRS) resource set for use in at least a radio resource control (RRC) idle state or an RRC inactive state and (ii) information on a validity duration for the at least one TRS resource set, and
        receive, from the base station, downlink control information (DCI) with a cyclic redundancy check (CRC) scrambled by a paging early indication (PEI) radio network temporary identifier (RNTI), wherein the DCI includes an availability indication providing a bitmap associated with the at least one TRS resource set of the configuration; and
    a processor operably coupled with the transceiver, the processor configured to identify a TRS resource set among the at least one TRS resource set based on a value of a bit of the bitmap, wherein the TRS resource set is available for the validity duration.

2. The terminal of claim 1, wherein the validity duration includes a multiple of a paging cycle starting from a radio frame in which the DCI is received.

3. The terminal of claim 1, wherein bits of the bitmap are associated with TRS resource sets, respectively, and indicate whether the associated TRS resource sets are available or not.

4. The terminal of claim 1, wherein the validity duration is two paging cycles starting from a first system frame number in which the DCI is received.

5. A base station in a wireless communication system, the base station comprising:
    a processor configured to determine a higher layer signaling including (i) a configuration of at least one tracking reference signal (TRS) resource set for a radio resource control (RRC) idle state or an RRC inactive state and (ii) information on a validity duration for the at least one TRS resource set; and
    a transceiver operably coupled with the processor, the transceiver configured to transmit, to a terminal, downlink control information (DCI) with a cyclic redundancy check (CRC) scrambled by a paging early indication (PEI) radio network temporary identifier (RNTI), wherein the DCI comprises an availability indication including a bitmap associated with the at least one TRS resource set of the configuration,
    wherein a TRS resource set among the at least one TRS resource set is available for the validity duration based on a value of a bit of the bitmap.

6. The base station of claim 5, wherein the validity duration includes a multiple of paging cycle starting from a radio frame in which the DCI is transmitted.

7. The base station of claim 5, wherein bits of the bitmap are associated with TRS resource sets, respectively, and indicate whether the associated TRS resource sets are available or not.

8. The base station of claim 5, wherein the validity duration is two paging cycles starting from a first system frame number in which the DCI is transmitted.

9. A method performed by a terminal in a wireless communication system, the method comprising:
    receiving, from a base station, a higher layer signaling including (i) a configuration of at least one tracking reference signal (TRS) resource set for a radio resource control (RRC) idle state or an RRC inactive state and (ii) information on a validity duration for the at least one TRS resource set;
    receiving, from the base station, downlink control information (DCI) with a cyclic redundancy check (CRC) scrambled by a paging early indication (PEI) radio network temporary identifier (RNTI), wherein the DCI comprises an availability indication including a bitmap associated with the at least one TRS resource set of the configuration; and
    identifying a TRS resource set among the at least one TRS resource set based on a value of a bit of the bitmap, wherein the TRS resource set is available for the validity duration.

10. The method of claim 9, wherein the validity duration includes a multiple of paging cycle starting from a radio frame in which the DCI is received.

11. The method of claim 9, wherein bits of the bitmap are associated with TRS resource sets, respectively, and indicate whether the associated TRS resource sets are available or not.

12. The method of claim 9, wherein the validity duration is two paging cycles starting from a first system frame number in which the DCI is received.

13. A method performed by base station in a wireless communication system, the method comprising:
    determining a higher layer signaling including (i) a configuration of at least one tracking reference signal (TRS) resource set for a radio resource control (RRC) idle state or an RRC inactive state and (ii) information on a validity duration for the at least one TRS resource set; and
    transmitting, to a terminal, downlink control information (DCI) with a cyclic redundancy check (CRC) scrambled by a paging early indication (PEI) radio network temporary identifier (RNTI), wherein the DCI comprises an availability indication including a bitmap associated with the at least one TRS resource set of the configuration, wherein a TRS resource set among the at least one TRS resource set is available for the validity duration based on a value of a bit of the bitmap.

14. The method of claim 13, wherein the validity duration includes a multiple of paging cycle starting from a radio frame in which the DCI is transmitted.

15. The method of claim 13, wherein bits of the bitmap are associated with TRS resource sets, respectively, and indicate whether the associated TRS resource sets are available or not.

16. The method of claim 13, wherein the validity duration is two paging cycles starting from a first system frame number in which the DCI is transmitted.

* * * * *

UNITED STATES PATENT AND TRADEMARK OFFICE
CERTIFICATE OF CORRECTION

Page 1 of 1

PATENT NO.       : 12,068,993 B2
APPLICATION NO.  : 17/650065
DATED            : August 20, 2024
INVENTOR(S)      : Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this
Twelfth Day of August, 2025

Coke Morgan Stewart
*Acting Director of the United States Patent and Trademark Office*